United States Patent
Murakami et al.

(10) Patent No.: US 6,873,711 B1
(45) Date of Patent: Mar. 29, 2005

(54) IMAGE PROCESSING DEVICE, IMAGE PROCESSING METHOD, AND STORAGE MEDIUM

(75) Inventors: Tomochika Murakami, Kanagawa (JP); Junichi Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 593 days.

(21) Appl. No.: 09/676,949

(22) Filed: Oct. 2, 2000

(30) Foreign Application Priority Data

Nov. 18, 1999 (JP) .......................... 11-328427

(51) Int. Cl.⁷ .................. G06K 9/00; G06K 15/00; H04N 9/43; H04N 1/40
(52) U.S. Cl. .................. 382/100; 348/32; 358/2.1
(58) Field of Search ................ 382/100, 162; 358/2.1, 1.9, 1.14; 348/32–35; 380/220

(56) References Cited

U.S. PATENT DOCUMENTS

| | | | | |
|---|---|---|---|---|
| 4,998,165 A | * | 3/1991 | Lindstrom | 348/34 |
| 5,168,352 A | * | 12/1992 | Naka et al. | 348/34 |
| 5,210,600 A | * | 5/1993 | Hirata | 358/527 |
| 5,332,968 A | * | 7/1994 | Brown | 324/309 |
| 5,534,915 A | * | 7/1996 | Sandrew | 348/29 |
| 5,652,626 A | * | 7/1997 | Kawakami et al. | 348/463 |
| 6,125,201 A | * | 9/2000 | Zador | 382/166 |
| 6,332,030 B1 | * | 12/2001 | Manjunath et al. | 382/100 |
| 6,351,558 B1 | * | 2/2002 | Kuwata | 382/168 |
| 6,590,996 B1 | * | 7/2003 | Reed et al. | 382/100 |

OTHER PUBLICATIONS

Chae et al., Color Image Embedding using Multidimensional Lattice Structures, 1998, IEEE, pp. 460–464.*
Piva et al., Exploiting the cross–correlation of RGB–channels for robust watermarking of color images, 1999, IEEE, pp. 306–310.*

* cited by examiner

*Primary Examiner*—Leo Boudreau
*Assistant Examiner*—Shefali Patel
(74) *Attorney, Agent, or Firm*—Fitzpatrick, Cella, Harper & Scinto

(57) ABSTRACT

An image processing device is provided to efficiently embed digital watermark information in a gray scale image while suppressing deterioration in the image quality. The image processing device includes an input unit for inputting grayscale image data in which each pixel is formed of one component. A converter converts the format of the grayscale image data into color image data in which each pixel is formed of a plurality of components. An embedding unit embeds the digital watermark information in part of the components of the color image data obtained by the converter.

30 Claims, 34 Drawing Sheets

0303  0302              0301

FIG. 8A
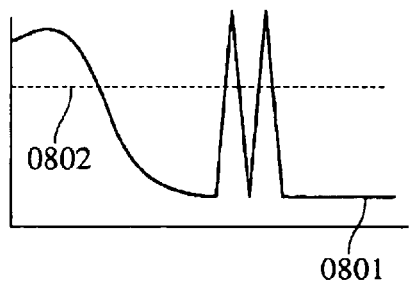
FIG. 8B
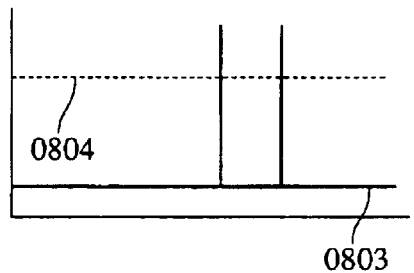
FIG. 9
| +c | +c | +c | +c | 0 | 0 | 0 | 0 |
|----|----|----|----|---|---|---|---|
| +c | +c | +c | +c | 0 | 0 | 0 | 0 |
| +c | +c | +c | +c | 0 | 0 | 0 | 0 |
| +c | +c | +c | +c | 0 | 0 | 0 | 0 |
| 0 | 0 | 0 | 0 | -c | -c | -c | -c |
| 0 | 0 | 0 | 0 | -c | -c | -c | -c |
| 0 | 0 | 0 | 0 | -c | -c | -c | -c |
| 0 | 0 | 0 | 0 | -c | -c | -c | -c |
0901

$\Gamma''(x, y)$ $\otimes$ CONVOLUTION $P(x, y)$ $= 0$

| 0  | 0  | 0  | 0  | +c | +c | +c | +c |
|----|----|----|----|----|----|----|----|
| 0  | 0  | 0  | 0  | +c | +c | +c | +c |
| 0  | 0  | 0  | 0  | +c | +c | +c | +c |
| 0  | 0  | 0  | 0  | +c | +c | +c | +c |
| -c | -c | -c | -c | 0  | 0  | 0  | 0  |
| -c | -c | -c | -c | 0  | 0  | 0  | 0  |
| -c | -c | -c | -c | 0  | 0  | 0  | 0  |
| -c | -c | -c | -c | 0  | 0  | 0  | 0  |

3302

| -c | -c | 0  | 0  | 0  | 0  | -c | -c |
|----|----|----|----|----|----|----|----|
| -c | -c | 0  | 0  | 0  | 0  | -c | -c |
| 0  | 0  | +c | +c | +c | +c | 0  | 0  |
| 0  | 0  | +c | +c | +c | +c | 0  | 0  |
| 0  | 0  | +c | +c | +c | +c | 0  | 0  |
| 0  | 0  | +c | +c | +c | +c | 0  | 0  |
| -c | -c | 0  | 0  | 0  | 0  | -c | -c |
| -c | -c | 0  | 0  | 0  | 0  | -c | -c |

FIG. 34

FIG. 35A    FIG. 35B
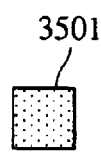
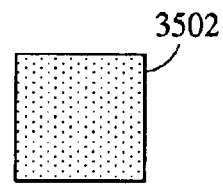
FIG. 36
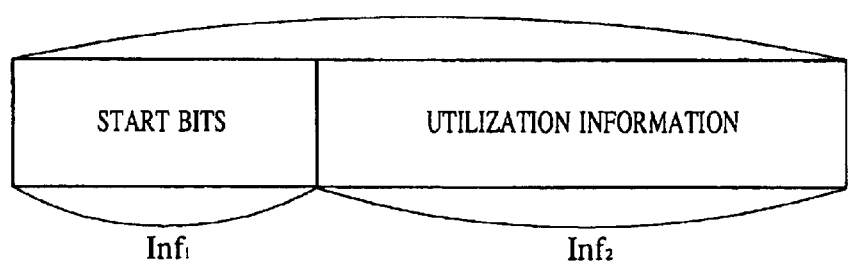

FIG. 37

| 69 | 211 | 9 | 217 | 16 | 35 | 190 | 101 |
|---|---|---|---|---|---|---|---|
| 87 | 197 | 109 | 180 | 117 | 212 | 71 | 114 |
| 166 | 28 | 55 | 143 | 104 | 146 | 85 | 130 |
| 64 | 206 | 179 | 48 | 240 | 232 | 108 | 154 |
| 67 | 40 | 91 | 224 | 37 | 32 | 223 | 194 |
| 203 | 214 | 106 | 231 | 169 | 4 | 208 | 24 |
| 47 | 195 | 27 | 61 | 2 | 155 | 81 | 213 |
| 251 | 84 | 202 | 184 | 170 | 10 | 46 | 138 |

PARTIAL COEFFICIENT ARRAY
OF BLUE NOISE MASK

FIG. 38

| 73 | 244 | 124 | 207 | 70 | 254 | 117 | 196 |
|---|---|---|---|---|---|---|---|
| 38 | 177 | 11 | 132 | 43 | 186 | 4 | 138 |
| 104 | 221 | 93 | 231 | 100 | 211 | 85 | 237 |
| 23 | 151 | 55 | 165 | 26 | 153 | 56 | 172 |
| 67 | 250 | 113 | 193 | 79 | 240 | 123 | 203 |
| 47 | 188 | 1 | 142 | 33 | 183 | 14 | 128 |
| 96 | 215 | 83 | 232 | 111 | 218 | 91 | 227 |
| 28 | 157 | 60 | 171 | 17 | 147 | 51 | 160 |

PARTIAL COEFFICIENT ARRAY
OF CONE MASK

RADIAL SPATIAL FREQUENCY [cycle/deg]
log scale

MINIMUM CODING UNIT (MCU)

FIG. 42

|  |  |  |  |  |  |  |  |
|---|---|---|---|---|---|---|---|
| +c | +c | +c | +c | 0 | 0 | 0 | 0 |
| +c | +c | +c | +c | 0 | 0 | 0 | 0 |
| +c | +c | -c | +c | 0 | 0 | 0 | 0 |
| +c | +c | +c | +c | 0 | 0 | 0 | 0 |
| 0 | 0 | 0 | 0 | -c | -c | -c | -c |
| 0 | 0 | 0 | 0 | -c | -c | -c | -c |
| 0 | 0 | 0 | 0 | -c | -c | -c | -c |
| 0 | 0 | 0 | 0 | -c | -c | -c | -c |

4201 (upper-left block), 4202 (lower-right block)

IMAGE PROCESSING DEVICE, IMAGE PROCESSING METHOD, AND STORAGE MEDIUM

BACKGROUND OF THE INVENTION

1. Field of the Invention

The present invention relates to an image processing device and an image processing method for embedding digital watermark information in input image data so that the digital watermark information is not perceptible to human eyes, and to a storage medium for storing the image processing method.

2. Description of the Related Art

Recently, various types of information including text data, image data, and audio data have been digitized due to rapid development and dissemination of computers and computer networks. Digital information is advantageous in that it does not deteriorate by aging and that it can indefinitely and reliably store information. In contrast, the digital information can be easily duplicated, causing a serious problem in copyright protection.

Therefore, security techniques have rapidly become important for copyright protection.

One type of copyright protection technique uses an "digital watermark". The digital watermark technique embeds the name of a copyright holder or the ID of a purchaser in digital image data, audio data, or text data so that the digital watermark is not perceptible to a person. Hence, it is possible to track unpermitted usage by illegal copying.

Besides the copyright protection, the digital watermark is applied to a technique for detecting interpolation in digital data by embedding the digital watermark in advance and by matching information using a digital data embedding rule.

Since the digital watermark technique embeds information by processing a portion such that the change in digital data is not perceptible to a person, there is a trade-off among the quality compared with the original, the resistance of the digital watermark to being lost when image data is attacked or distorted, and the amount of embeddable information of the digital data in which the digital watermark is embedded.

Hitherto, the digital watermark has been embedded in a gray-scale image by simply regarding the gray-scale image as gray-scale image data and converting the gray level. This results in serious image deterioration.

SUMMARY OF THE INVENTION

Accordingly, it is an object of the present invention to efficiently embed digital watermark information in a gray-scale image while suppressing image deterioration.

According to an aspect of the present invention, the foregoing objects are achieved through provision of an image processing device for embedding digital watermark information in a gray-scale image. The image processing device includes an input unit for inputting gray-scale image data in which each pixel is formed of one component. A converter converts the format of the gray-scale image data into color image data in which each pixel is formed of a plurality of components. An embedding unit embeds the digital watermark information in part of the components of the color image data obtained by the converter.

In particular, the present invention is appropriate to a case in which original image data is converted by a JPEG compression technique into color image data having brightness and chrominance components, and digital watermark information is embedded in the color image data.

According to further aspects of the present invention, a method is provided including the steps of inputting gray-scale image data in which each pixel is formed of one component, converting the format of the gray-scale image data into color image data in which each pixel is formed of a plurality of components, and embedding digital watermark information in part of the components of the color image data obtained by the converting step.

According to a further aspect of the present invention, a storage medium is provided having recorded thereon a computer-readable program for performing the steps of inputting gray-scale image data in which each pixel is formed of one component, converting the format of the gray-scale image data into color image data in which each pixel is formed of a plurality of components, and embedding digital watermark information in part of the components of the color image data obtained by the converting step.

According to yet a further aspect of the present invention, an image processing device for embedding digital watermark information in a gray-scale image is provided that has an input device that inputs gray-scale image data, wherein each pixel is formed of one component. The device includes a color converter that converts the gray-scale image data into color image data in which each pixel is formed of a plurality of components, a color component extracting unit that separates a part of the plurality of components from the remaining components of the color image data, and an embedding unit that adds the digital watermark information to the part of the plurality of components separated by the color component extracting unit.

Further objects, features and advantages of the present invention will become apparent from the following description of the preferred embodiments with reference to the attached drawings.

BRIEF DESCRIPTION OF THE DRAWINGS

FIGS. 8A and 8B are illustrations of extraction of the registration signal;

FIG. 9 is an illustration of a pattern array used for embedding and extracting additional information;

FIG. 19 is an illustration of computation for embedding the additional information Inf;

FIG. 22 is an illustration of extracting the additional information Inf when the additional information Inf is not embedded;

FIGS. 33A and 33B are illustrations of examples of pattern arrays orthogonal to the pattern shown in FIG. 9;

FIG. 34 is an illustration of the "orthogonal" pattern array;

FIGS. 35A and 35B are illustrations of first and second position reference masks;

FIG. 36 is an illustration of the configuration of the additional information Inf;

FIG. 37 is an illustration of an example of coefficients in the blue noise mask;

FIG. 38 is an illustration of an example of coefficients of the pixel levels in the cone mask;

FIG. 42 is an illustration of a pattern array (patch).

DESCRIPTION OF THE PREFERRED EMBODIMENTS

The present invention will be understood from the following descriptions of the preferred embodiments.

A digital watermark embedding unit according to one preferred embodiment of the present invention is described with reference to the accompanying drawings.

Figure 1:
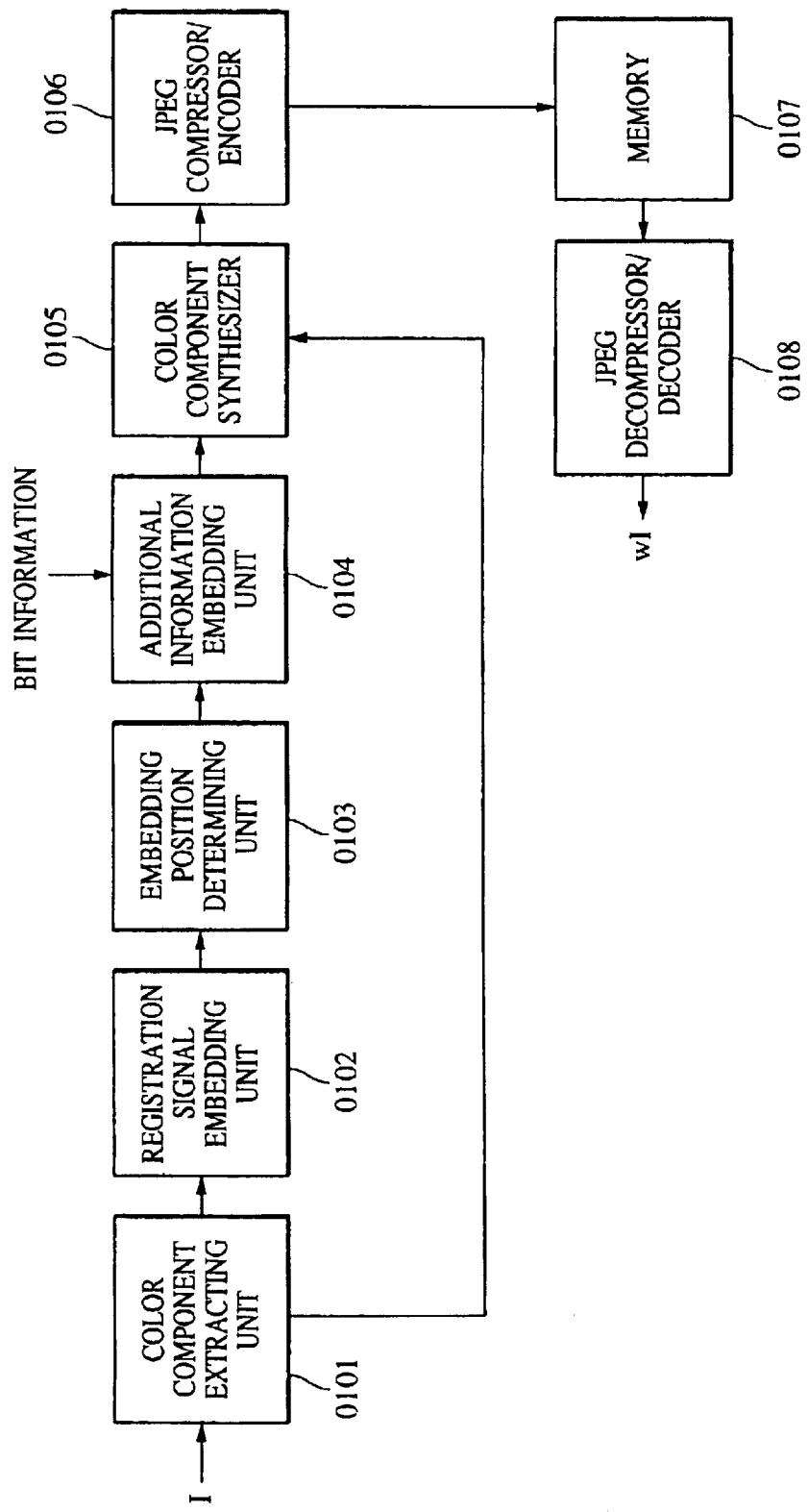
FIG. 1 is a block diagram of a digital watermark embedding unit.

FIG. 1 shows the digital watermark embedding unit of the present embodiment. Referring to FIG. 1, the digital watermark embedding unit includes a color component extracting unit 0101, a registration signal embedding unit 0102, an embedding position determining unit 0103, an additional information embedding unit 0104, a color component synthesizer 0105, a JPEG compressor/encoder 0106, a memory 0107, and a JPEG decompressor/decoder 0108.

Image data I is input to the digital watermark embedding unit. The image data I is multi-level image data in which a predetermined plurality of bits is allocated to one pixel.

According to the present embodiment, the input image data I may be gray-scale image data or color image data. The gray-scale image data is formed of one type of component per pixel, whereas the color image data is formed of three types of components per pixel. In the present embodiment, the three types of components are a red component (R), a green component (G), and a blue component (B). Alternatively, the present invention is applicable to a different combination of color components.

The image data I input to the digital watermark embedding unit is first input to the color component extracting unit 0101.

When the input image data I is color image data, the color component extracting unit 0101 separates only the blue component from the color image data, and outputs the blue component to the registration signal embedding unit 0102 at the subsequent stage.

In contrast, the other color components are output to the color component synthesizer 0105 at the subsequent stage. Specifically, only the color component in which digital watermark information is to be embedded is separated and sent to a digital watermark processing system.

According to the present embodiment, the digital watermark information is embedded in the blue component because, among the red component, the blue component, and the green component, human vision is most insensitive to the blue component. Embedding the digital watermark information in the blue component is advantageous in that, compared with the case of embedding the digital watermark information in the other color components, image deterioration due to the digital watermark information is less perceptible to human eyes.

When the input image data I is gray-scale image data, the color component extracting unit 0101 first converts the gray-scale image data into pseudo-color image data.

The pseudo-color image data is color image data formed of three types of components per pixel. According to the present embodiment, the three types of components (R, G, and B) have the same values.

The gray-scale image data is converted to the pseudo-color image data, and the blue component (B) in the color image data is extracted and output to the registration signal embedding unit 0102.

In contrast, the other color components are output to the color component synthesizer 0105 at the subsequent stage. In this manner, as in the case of the color image data described above, the digital watermark information is not embedded in all the color components, but only in the blue component.

In the following description, a distinction between the gray-scale image data as the image data I and the color image data as the image data I is not drawn whenever possible. Specifically, the color image data and the pseudo-color image data are not distinguished.

The registration signal embedding unit 0102 is described. The registration signal is a signal required to perform geometrical correction as preliminarily processing for extracting additional information Inf.

The image data of the blue component obtained by the color component extracting unit 0101 is input to the registration signal embedding unit 0102. The registration signal embedding unit 0102 embeds the registration signal in the image data using a digital watermark technique. Specifically, human vision cannot perceive the registration signal embedded in the image data. The process of embedding the registration signal is described in detail hereinafter.

The registration signal embedding unit 0102 outputs the image in which the registration signal is embedded.

Next the embedding position determining unit 0103 determines the embedding position for the additional information Inf in the image data input by the registration signal embedding unit 0102.

The embedding position determining unit 0103 outputs control data indicating the embedding position at which the additional information Inf is to be embedded in the image along with the input image data to the additional information embedding unit 0104.

Besides the image data and the control data, the additional information Inf including bits of information is input to the additional information embedding unit 0104. The additional information Inf is embedded at the embedding position determined as above in the image data of the blue component using the digital watermark technique. The process of embedding the additional information Inf using the digital watermark technique is described hereinafter.

The additional information embedding unit 0104 outputs the image data in which the additional information Inf is embedded to the color component synthesizer 0105.

The color component synthesizer 0105 synthesizes normal color image data using the blue component processed up to the previous stage (the additional information embedding unit 0104) and the red component and the green component directly input by the color component extracting unit 0101.

The color image data obtained by the color component synthesizer 0105 is output to the JPEG compressor/encoder 0106. The JPEG compressor/encoder 0106 converts the color image data formed by the input red component, the blue component, and the green component into color image data formed by brightness and chrominance components, thereby performing the JPEG compression/encoding.

The JPEG compressed data from the JPEG compressor/encoder 0106 is stored in the memory 0107. With a timing for transmitting to an external device or a timing for printing, the JPEG compressed data is read from the memory 0107 and output to the JPEG decompressor/decoder 0108 at the subsequent stage.

The JPEG decompressor/decoder 0108 decompresses the JPEG compressed data and outputs the data as color image data wI. The data wI is output to an external device, or converted into printing data (CMYK) to be used for printing.

Accordingly, the image data wI in which the registration signal and the additional information Inf are embedded using the digital watermark technique is output.

According to the present embodiment, various attacks are to be made on the image data wI, thus geometrically distorting the image data wI. For example, the attacks may be made by a user intentionally editing the image. Alternatively, the image data wI may be printed, and the printed image may be scanned by a scanner. The attacked image data becomes image data wI' shown in FIG. 2.

Figure 31:
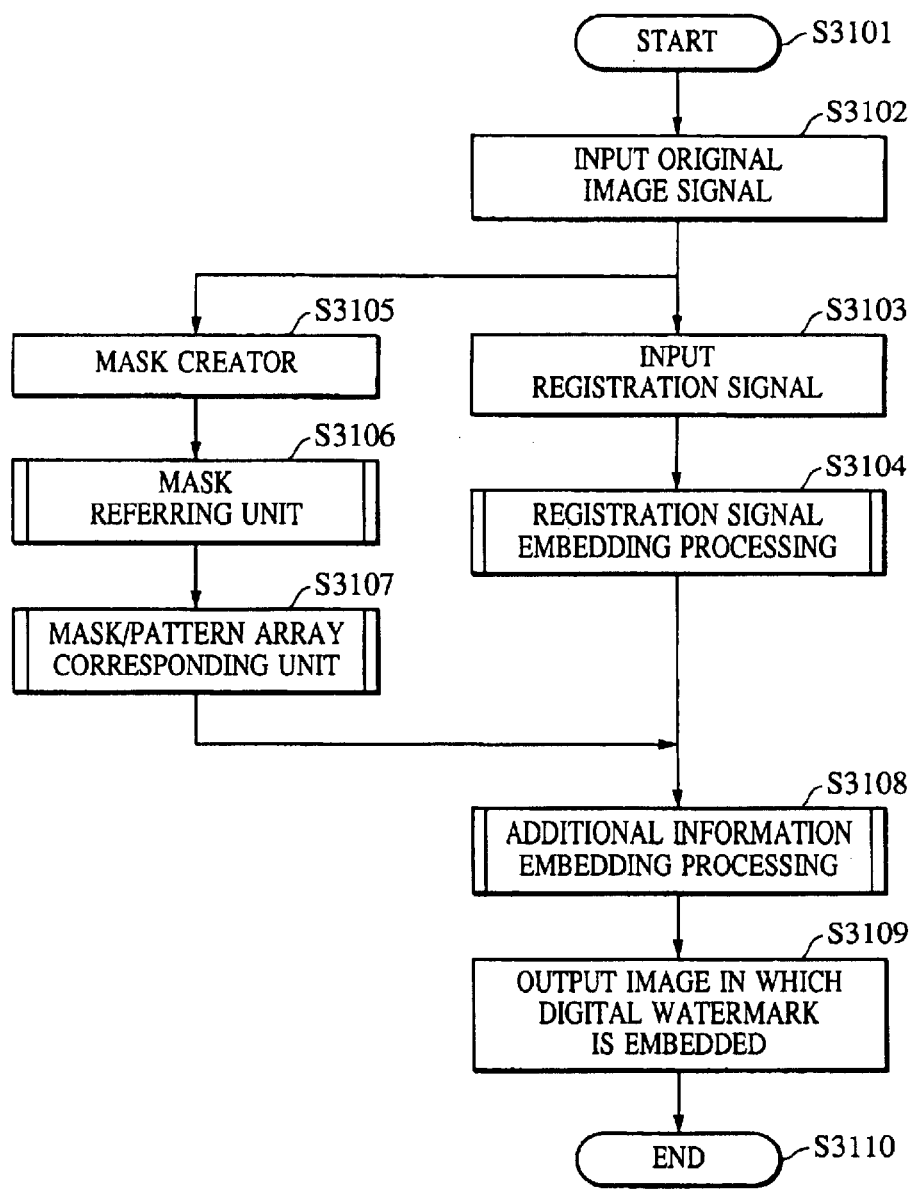
FIG. 31 is a flowchart showing a process of embedding a digital watermark.

Referring to FIG. 31, a process of embedding the digital watermark performed by the above units is described.

In step S3102, the image data I is input to the color component extracting unit 0101. This step may be performed by reading a photograph or a printed image by a scanner and generating image data. The blue component is separated, which is to be used for inputting the registration signal at the subsequent stage.

In step S3103, the registration signal is generated. The registration signal is embedded in step S3014. The registration signal embedding processing in step S3104 corresponds to the processing performed in the registration signal embedding unit 0102 shown in FIG. 1, and a detailed description thereof is given hereinafter.

In step S3105, a mask is created. The created mask is input in step S3106, thus specifying the relationship between embedded bit information and embedding positions. In step S3107, the mask is enlarged in size to generate an expanded mask. A detailed description of the mask/pattern array corresponding unit is given hereinafter.

In steps S3103 and 3104, the registration signal is embedded in the image data. In step S3108, the additional information Inf is embedded in the image data. The additional information embedding processing is performed by repetitively embedding the additional information Inf in units of macro blocks in the entire image. This processing is described in detail with reference to FIG. 10 in the following description. The macro block is the minimum embedding unit. All the information of one complete additional information Inf is embedded in an image region corresponding to the macro block.

In step S3109, the image data in which the additional information Inf is embedded is JPEG converted/encoded, stored in the memory 0107, and decompressed/decoded. The data is output as the image data wI. Before the digital watermark extraction processing shown in FIG. 32 starts, attacks may be made on the image data wI, thus geometrically distorting the image data wI.

A digital watermark extracting unit of the embodiment is described.

Figure 2:
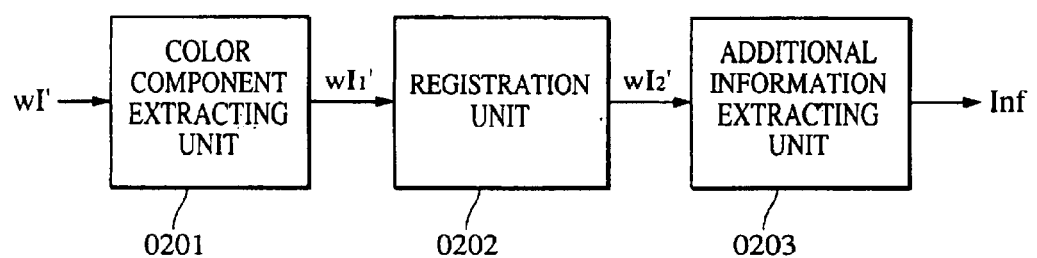
FIG. 2 is a block diagram of a digital watermark extracting unit.

FIG. 2 shows the digital watermark extracting unit of the present embodiment. Referring to FIG. 2, the digital watermark extracting unit includes a color component extracting unit 0201, a registration unit 0202, and an additional information extracting unit 0203.

The image data wI' is input to the digital watermark extracting unit. The image data wI' is generated by attacking the image data wI and geometrically distorting the image data wI (i.e., altering the image data wI). The types of attacks or distortions may include irreversible compression including JPEG compression, scaling, rotation, printing, and scanning. A combination of these factors may be employed to attack the image data wI.

Ideally, the image data wI' has the same content as that of the image data wI. In fact, however, the two image data wI' and wI often differ from each other significantly.

The image data wI' is input to the color component extracting unit 0201. The color component extracting unit 0201 extracts the blue component, and outputs the image data of the blue component to the registration unit 0202 at the subsequent stage. Since the other color components, i.e., the red component and the green component, are not required, they are discarded.

Image data $wI_1'$ of the blue component obtained by the color component extracting unit 0201 is input to the registration unit 0202. Using the image data $wI_1'$ of the blue component, image data $wI_2'$ for which the geometric distortion is corrected is generated.

As described above, the image data wI' and the image data wI may have different scales, whereas the image data $wI_2'$ and the image data wI have the same scale. The reason for this and a process of making the image data $wI_2'$ have the same scale as the image data wI are described in detail hereinafter.

The additional information extracting unit 0203 performs predetermined processing in accordance with the embedding mode used by the additional information embedding unit 0103, thereby extracting the additional information Inf embedded in the image data $wI_2'$. The additional information extracting unit 0203 outputs the extracted additional information Inf.

Figure 32:
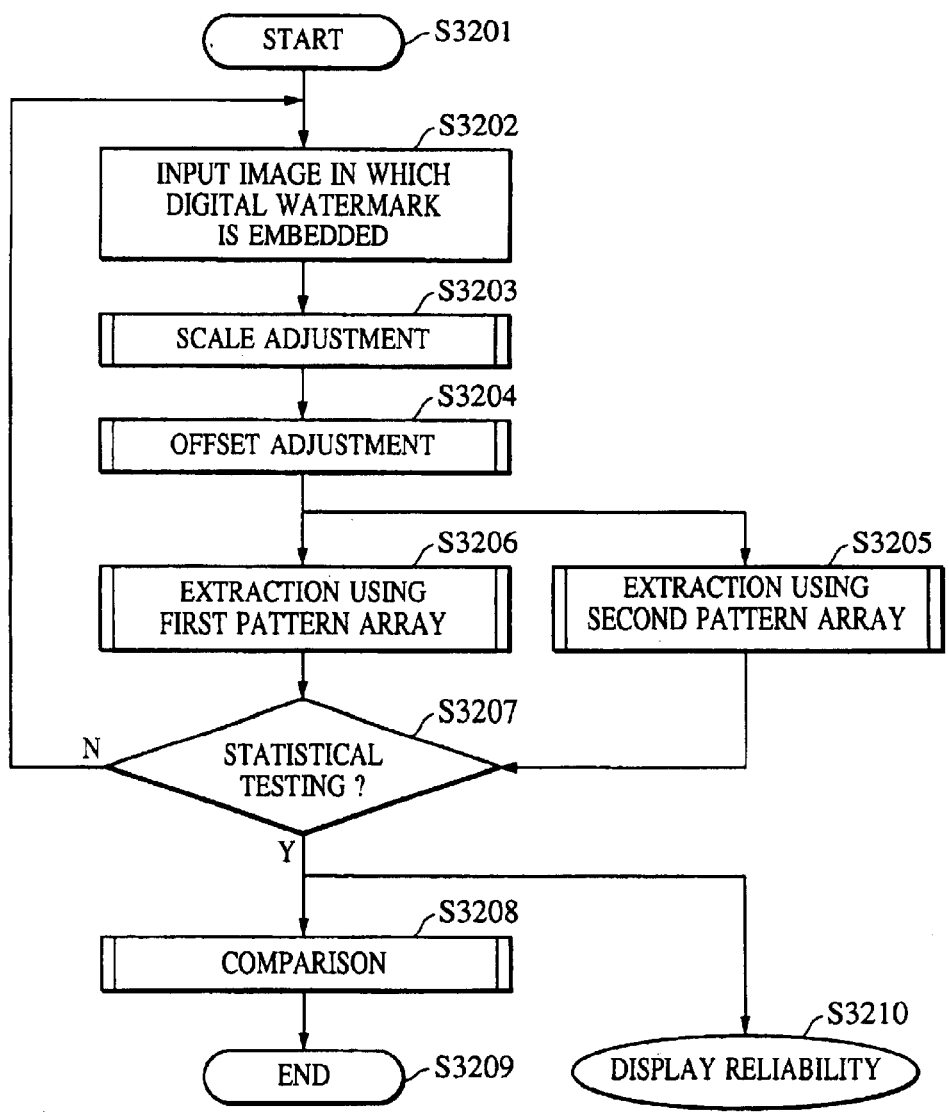
FIG. 32 is a flowchart showing a process of extracting a digital watermark.

Referring now to FIG. 32, a process of extracting the digital watermark performed by the above units is described. In step S3202, the image data wI' is input. The image data wI' can be obtained by reading image data, which is assumed to be the image data wI, from a network or memory, or by printing the image data wI and scanning the printed image by the scanner. In the latter case, it is highly probable that the image data wI' and the image data wI significantly differ from each other.

Only the blue component is extracted from the image data wI', which is to be used in the next step. In step S3203, the scale of the image data $wI_1'$ of the input blue component is corrected.

In step S3204, the offset of the image data $wI_1'$ of the input blue component is corrected. This scale adjustment is performed in the registration unit 0202, and a detailed description thereof is omitted here.

In step S3206, a first pattern array is used to perform extraction. In step S3205, a second pattern array is used to perform extraction. Accordingly, the embedded additional information Inf is extracted from the image data $wI_2'$ for which the scale and the offset have already been corrected.

In step S3207, statistical testing is performed by computing and determining the reliability of the extracted additional information Inf. If it is determined that the additional information Inf is incorrect, the process returns to step S3202 and re-inputs the image assumed to have the additional information Inf embedded. In contrast, if it is determined that the additional information Inf is sufficiently accurate, a comparison is performed in step S3208 to extract the additional information Inf. In step S3210, information indicating the reliability is displayed as a reliability index D.

The offset adjustment, extraction using the first pattern array, extraction using the second pattern array, statistical testing, and comparison are performed in the additional information extracting unit 0203 shown in FIG. 2, and detailed descriptions thereof are given hereinafter.

Each unit is described in detail below.

The registration processing performed by the registration unit 0202 at the digital watermark extraction side and in step S3203 is next described.

The registration is preliminary processing performed when extracting the additional information Inf, so that the additional information Inf can be extracted from the image data wI' input to the digital watermark extracting unit. In general, the term "registration processing" includes positional adjustment as well as the scale adjustment. According to the present embodiment, the positional adjustment utilizes positional information embedded as part of the additional information Inf. Hence, the positional adjustment is described along with the additional information extraction.

In the following description, the changes of the image data processed by a printing system are considered. Further, an appropriate registration for the changes and the printing system is considered.

The image data wI output from the digital watermark embedding unit is not always input as it is to the digital watermark extracting unit.

For example, the image data wI is printed by a CMYK ink jet printer, and the printed image is scanned by the scanner. When the output resolution of the printer and the input resolution of the scanner are different, the original color image data wI and the image data obtained by scanning have different scales. Therefore, it is less likely that the additional information Inf is reliably extracted from the obtained image data wI'. It is thus necessary to provide a correction unit for correcting the difference in the scales.

According to the present embodiment, both the input resolution and the output resolution are known. Hence, it is possible to compute a scale ratio based on these ratios. For example, when the output resolution is 600 dpi and the input resolution is 300 dpi, the scale ratio between the image before printing and the scanned image is two. An appropriate scaling algorithm in accordance with the computed scale ratio is used to apply scaling to the image data wI'. Accordingly, the image size of the image data wI and the image size of the image data wI' will have the same scale.

However, the output and input resolutions are not always known. When neither of the resolutions are known, the above processing cannot be performed. In this case, it is necessary not only to correct the difference in the scales but also to know the scale ratio.

Figure 3:
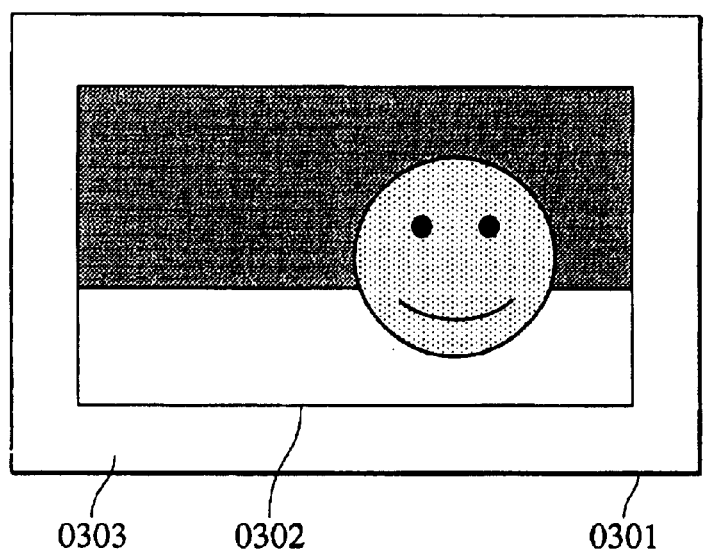
FIG. 3 is an illustration of an example of image data generated by an extracting side in printer processing.

When the image data wI is processed by the printing system and the printed image is scanned by the scanner, the resultant image to be input is as shown in FIG. 3. Referring to FIG. 3, the entirety of an image 0301 is represented by the image data wI'. The image data 0301 includes an original image 0302 represented by the image data wI and a white margin 0303. When the user tries to cut such a margin using a mouse or the like, the cutting is not accurately performed.

The above mentioned points always occur in the image representing the image data wI' obtained through the printing system. When the image data wI is processed by the printing system, it is necessary to solve these problems. The positional adjustment for correcting the positional displacement caused by scanning is performed by the offset adjustment performed by the additional information extracting unit 0203.

In the foregoing description, the case in which the image data is obtained by processing the image data at least once by the printing system before extracting the digital watermark is described. Similar problems may be caused by editing by a user.

Hereinafter it is assumed that the ratio of the input and output resolutions is not known. The registration signal embedding unit 0102 and the registration unit 0202 for solving the problems caused by the difference in scales are described.

The registration signal embedding unit 0102 (step S3104) is described first.

The registration signal embedding unit 0102 is provided prior to the additional information embedding unit 0104. The registration signal embedding unit 0102 is provided to embed in advance the registration signal, which is referred to when the image data wI' is registered by the registration unit 0202, in the original image data. The registration signal is embedded as the digital watermark information in image data (in this embodiment, the blue component of the color image data) which is imperceptible to the human eye.

Figure 4:
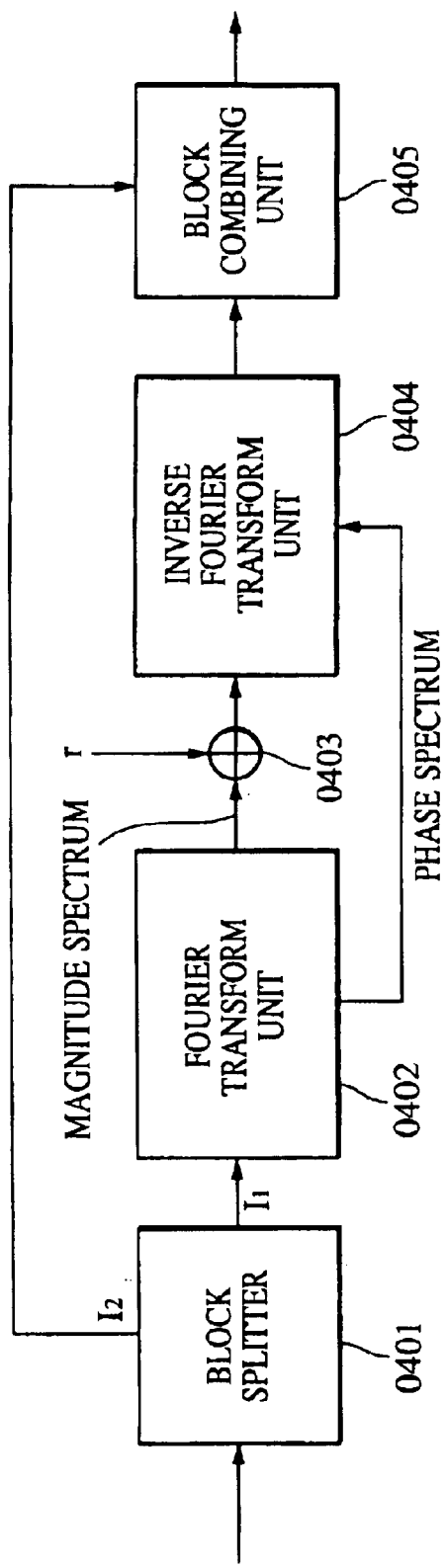
FIG. 4 is a block diagram of a registration signal embedding unit.

FIG. 4 shows the internal structure of the registration signal embedding unit 0102. Referring to FIG. 4, the registration signal embedding unit 0102 includes a block splitter 0401, a Fourier transform unit 0402, an adder 0403, an inverse Fourier transform unit 0404, and a block combining unit 0405. Each unit is described in detail.

The block splitter 0401 splits the input image data into a plurality of blocks so that they do not overlap each other. The size of each block is defined as a power of two. In fact, the present invention is applicable to other sizes. When the size of the block is a power of two, the Fourier transform unit 0402, which is connected to the block splitter 0401, can perform processing at high speed.

The block splitter 0401 splits the data into two sets of blocks $I_1$ and $I_2$. The set $I_1$ is input to the Fourier transform unit 0402 at the subsequent stage, and the set $I_2$ is input to the block combining unit 0405 at the subsequent stage. In the present embodiment, the block nearest to the center of the image data I among the blocks obtained by the block splitter 0401 is selected as the set $I_1$. The rest of the blocks are selected as the set $I_2$.

Only one block is selected as the set $I_1$ because the present embodiment can be implemented by using at least one block. In addition, the smaller the number of blocks, the shorter the processing time becomes. The present invention also covers cases in which two or more blocks are selected as the set $I_1$.

It is necessary for the digital watermark embedding unit and the digital watermark extracting unit to share information concerning the size of each block and which block is selected as a target for embedding the registration signal.

The set $I_1$, which is part of the image data obtained by splitting by the block splitter 0401, is input to the Fourier transform unit 0402.

The Fourier transform unit 0402 performs a Fourier transform on the input image data $I_1$. The original data configuration of the input image data $I_1$ is referred to as the spatial domain, whereas the data configuration after the Fourier transform is performed is referred to as the frequency domain. The Fourier transform is performed for all the input blocks. Since the size of each input block is a power of two in the embodiment, the fast Fourier transform (FFT) is employed to increase the processing speed.

The fast Fourier transform is a transform algorithm implementable with $(n/2)\log_2(n)$ computations, whereas the Fourier transform requires n×n computations where n is a positive integer. The only difference between the fast Fourier transform and the Fourier transform is the speed of obtaining the computation result, and the same result can be obtained by the two methods. In the present embodiment, the fast Fourier transform and the Fourier transform are not distinguished.

The image data in the frequency domain obtained by the Fourier transform is expressed by the magnitude spectrum and the phase spectrum. Only the magnitude spectrum is input to the adder 0403. In contrast, the phase spectrum is input to the inverse Fourier transform unit 0404.

Next, the adder 0403 is described. The magnitude spectrum and a signal r referred to as the registration signal are input to the adder 0403. For example, the registration signal includes impulse signals as shown in FIG. 5.

Figure 5:
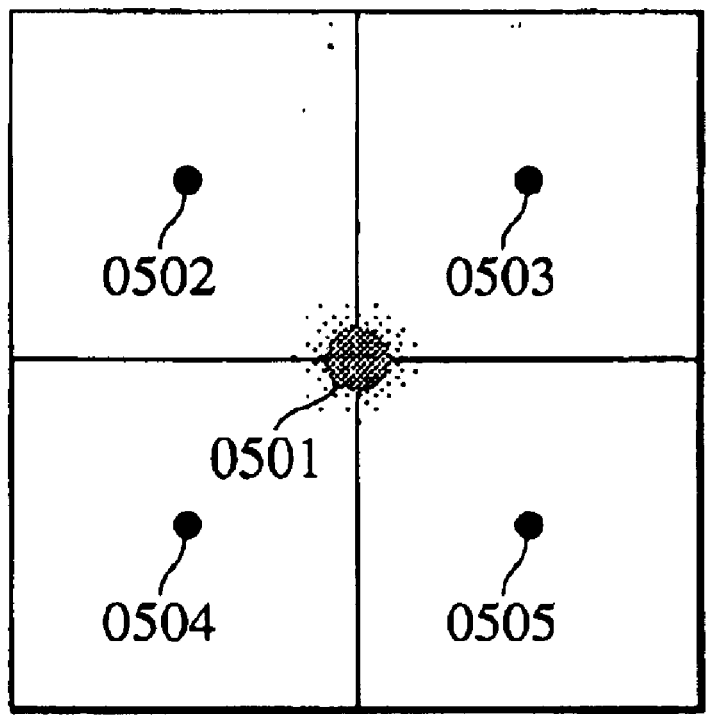
FIG. 5 is an illustration of a registration signal.

FIG. 5 shows the magnitude spectrum of the two-dimensional spatial frequency components obtained by the Fourier transform. The center indicates a low-frequency component, and the periphery thereof indicates high-frequency components. A magnitude spectrum 0501 is the magnitude spectrum of a signal component of the original image component. In the case of a signal corresponding to a natural image including a photograph, many strong signals are present at the lower frequency. In contrast, almost no signal is present at the higher frequency.

Although it is assumed, in the present embodiment, that a series of processes are performed on a natural image, the present invention is not limited to this. A text image, a CG image, and the like may be processed in a similar manner. The present embodiment is particularly advantageous in processing a natural image having relatively large portions at intermediate gray levels.

FIG. 5 shows the signal 0501 originally included in the natural image in which impulse signals 0502 to 0505 are added to a horizontal and vertical Nyquist frequency component of a signal in the frequency domain. As shown in FIG. 5, the registration signal preferably includes impulse signals because it enables the digital watermark extracting unit to easily extract only the registration signal.

Although the impulse signals are added to the Nyquist frequency component of the input signal in FIG. 5, the present invention is not limited to this. Specifically, any type of registration signal is permitted as long as the registration signal is retained even when the image in which the additional information Inf is embedded is attacked. As described above, an irreversible compression system including JPEG compression has an effect similar to a low-pass filter. Therefore, when the impulse signals are embedded in the high-frequency components which are to be compressed, the impulse signals may be removed by compression/decompression.

In contrast, embedding the impulse signals in the low-frequency components has a drawback, compared with embedding the signals in the high-frequency components, in that the signals embedded in the low-frequency components are often perceived as noise due to human vision characteristics. In the present embodiment, the impulse signals are embedded in an intermediate frequency, which is in a range from a first frequency substantially imperceptible to human vision to a second frequency which is difficult to remove by irreversible compression/decompression. The registration signal is appended to each block (one block in the embodiment) input to the adder 0403.

The adder 0403 outputs a signal in which the registration signal has been added to the magnitude spectrum of the image data in the frequency domain to the inverse Fourier transform unit 0404.

The inverse Fourier transform unit 0404 performs an inverse Fourier transform on the input image data in the frequency domain. The inverse Fourier transform is performed for all the input blocks. As in the case of the Fourier transform unit 0402, the inverse Fourier transform unit 0404 employs the fast Fourier transform to increase the processing speed since the size of each input block is a power of two. The signal in the frequency domain input to the inverse Fourier transform 0404 is transformed to a signal in the spatial domain by the inverse Fourier transform, and the signal in the spatial domain is output.

The image data in the spatial domain output from the inverse Fourier transform unit 0404 is input to the block combining unit 0405.

The block combining unit 0405 performs the reverse processing of the splitting by the block splitter 0405. As a result, the image data (blue component) is recovered and output.

The registration signal embedding unit 0102 of the present embodiment has the structure described in detail above.

FIG. 4 illustrates embedding of the registration signal in the Fourier transform domain. Alternatively, the registration signal can be embedded in the spatial domain. The latter case is described with reference to FIG. 29.

Figure 29:
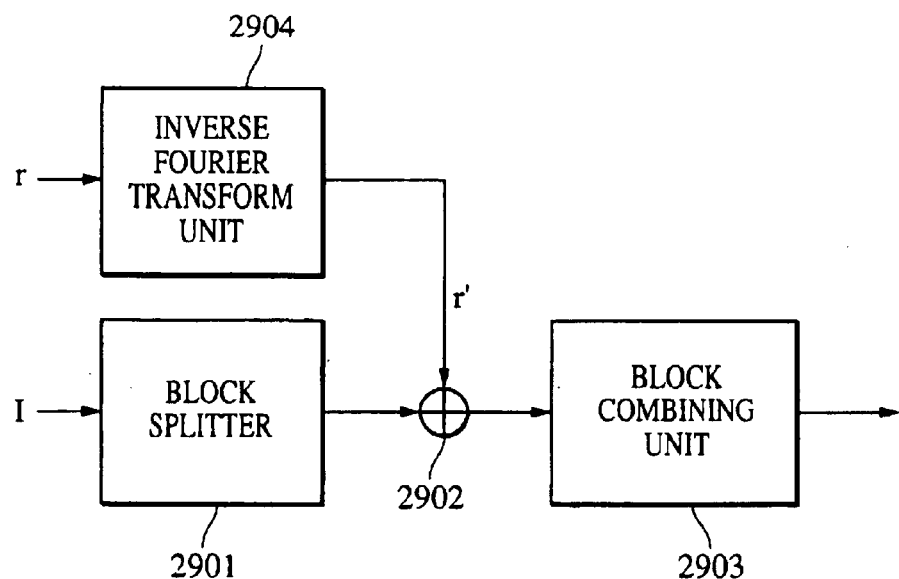
FIG. 29 is a block diagram of the registration signal embedding unit in a spatial domain.

FIG. 29 shows a block splitter 2901, an adder 2902, a block combining unit 2903, and an inverse Fourier transform unit 2904.

The block splitter 2901 and the block combining unit 2903 operate in the same manner as the block splitter 0401 and the block combining unit 0405 shown in FIG. 4. When the image data is input to the registration signal embedding unit 0102, the image data is first input to the block splitter 2901 and the data is split into blocks. The blocks are input to the adder 2902. In contrast, the registration signal r is input to the inverse Fourier transform unit 2904 and transformed into a signal r' by the inverse Fourier transform. The registration signal r is a signal in the frequency domain, as shown in FIG. 5. The block from the block splitter 2901 and the signal r' from the inverse Fourier transform unit 2904 are input to the adder 2902, and a summation thereof is performed. A signal output from the adder 2902 is input to the block combining unit 2903. Hence, the image data (blue component) is recovered and output.

The structure of the units shown in FIG. 29 performs the same processing as that shown in FIG. 4 in the spatial domain. Since the structure shown in FIG. 29 does not include a Fourier transform unit as compared with the structure in FIG. 4, the processing speed is increased.

Referring to FIG. 29, the signal r' is independent of the input image data I. Therefore, computation of the signal r', that is, processing of the inverse Fourier transform unit 2904, need not be performed every time the image data I is input. The signal r' can be generated in advance. In this case, the inverse Fourier transform unit 2904 can be eliminated from the structure shown in FIG. 29, thereby further increasing the speed of embedding the registration signal. The registration processing for referring to the registration signal is described in the following description.

According to the present embodiment, a principle referred to as a patchwork method is used to embed the additional information Inf. The principle of the patchwork method is described.

The patchwork method performs embedding of the additional information Inf by generating statistical bias in an image.

Figure 30:
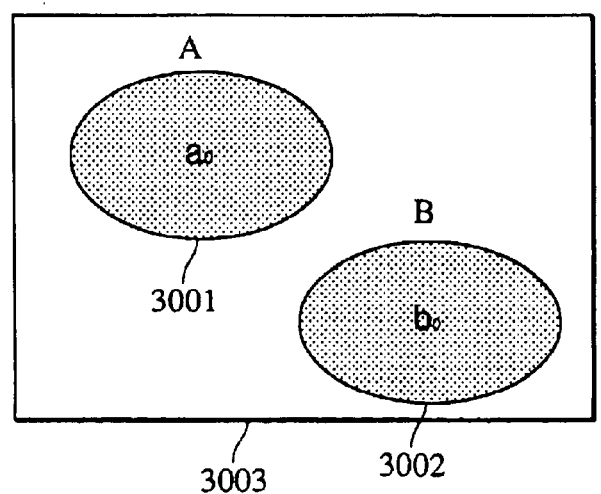
FIG. 30 is an illustration of two sets in a patchwork method.

This is described with reference to FIG. 30. FIG. 30 shows subset A 3001, subset B 3002, and an entire image 3003. The subsets A 3001 and the subset B 3002 are selected from the entire image 3003.

As long as the two subsets A and B are selected so that they do not overlap each other, the additional information Inf can be embedded using the patchwork method of the present embodiment. The size and selection of the two subsets strongly influence the resistance of the additional information Inf embedded by the patchwork method, that is, the strength for retaining the additional information Inf when the image data wI is attacked. This is described in the following description.

The subsets A and B include N-number of elements expressed as A={$a_1, a_2, \ldots, a_N$} and B={$b_1, b_2, \ldots, b_N$}. Each element $a_1$ and $b_1$ of the subsets A and B is a pixel level or a set of pixel levels. In the present embodiment, the elements $a_i$ and $b_i$ correspond to part of the blue component in the color image data.

An index d is defined as:

$$d = (1/N)\Sigma(a_i - b_i) \tag{1}$$

This indicates the expectation value of the difference in the pixel levels of the two sets. When the subsets A and B are appropriately selected for a general natural image, and the index d is defined, then:

$$d \approx 0 \tag{2}$$

Hereinafter the index d is referred to as the reliability distance.

In contrast, each bit constructing the additional information Inf is embedded by the following equations:

$$a'_i = a_i + c$$

$$b'_i = b_i - c \tag{3}$$

In the above equations (3), the value c is added to all the elements constituting the subset A, and the value c is subtracted from all the elements constituting the subset B.

As in the above case, the subsets A and B are selected from the image in which the additional information Inf is embedded, and the index d is computed. This gives the following equation:

$$\begin{aligned}d &= (1/N)\Sigma(a'_i - b'_i) \\ &= (1/N)\Sigma\{(a_i + c) - (b_i - c)\} \\ &= (1/N)\Sigma(a_i - b_i) + 2c \\ &= 2c\end{aligned} \tag{4}$$

The index d does not become zero.

Specifically, an image is given, and the reliability distance d is computed for the image. When this gives d≈0, the additional information Inf is not embedded. When the value d is at a predetermined distance from zero, it is determined that the additional information Inf is embedded.

The basic idea of the patchwork method is as described above.

In the present embodiment, the patchwork method is applied to embed a plurality of bits of information. The patchwork method defines the selection method of selecting the subsets A and B using a pattern array.

The patchwork method performs embedding of the additional information Inf by adding or subtracting an element of the pattern array to or from a predetermined element of the original image.

FIG. 9 shows an example of a simple pattern array. The pattern array shown in FIG. 9 indicates a variation in the pixel level from the original image when reference to 8×8 pixels is made to embed one bit. As shown in FIG. 9, the pattern array includes array elements having positive values, array elements having negative values, and array elements having zero values.

In the pattern shown in FIG. 9, the corresponding pixel levels at positions indicated by the array elements +c are increased by c. This corresponds to the subset A. The corresponding pixel levels at positions indicated by the array elements −c are decreased by c. This corresponds to the subset B. The positions indicated by zero are included in neither of the subsets A and B.

In the embodiment, the number of positive array elements and the number of negative array elements are set to be equal so that the overall gray level of the image does not change. In other words, the sum of all the array elements in one pattern array is zero. This is a condition for extracting the additional information Inf, which is described in the following description.

Using the pattern array as described above, each bit of information constructing the additional information Inf is embedded.

In the present embodiment, the pattern shown in FIG. 9 is placed several times in different domains in the original image data, thereby increasing or decreasing the pixel levels. Accordingly, a plurality of bits of information, i.e., the additional information Inf, is embedded. In other words, combinations of, for example, the subsets A and B, subsets A' and B', subsets A" and B", and so forth are used in different domains of one image. Hence, the additional information Inf including a plurality of bits is embedded.

When the original image data is large, the additional information Inf is repetitively embedded. Since the patchwork method utilizes statistical properties, a sufficient number of times is required to make use of the statistical properties.

In the present embodiment, when embedding a plurality of bits, the domains in which the pixel levels are changed using the pattern array are set not to overlap each other. This is accomplished by determining, for each bit, a relative position for using the pattern array. Specifically, the relationship between a position of the pattern array at which first bit information constructing the additional information Inf is embedded and a position of the pattern array at which second bit information is embedded is appropriately set.

For example, when the additional information Inf is constituted of sixteen bits, the positional relationship among 8×8-pixel pattern arrays of first to sixteenth bits is relatively provided on a domain larger than 32×32 pixels so that deterioration in the image quality is suppressed.

Moreover, when the image data is large, the additional information Inf, namely the bits of information constructing the additional information Inf, is repetitively embedded as many times as possible. This is to reliably extract each bit of the additional information Inf. In particular, the repetition is essential in the present embodiment because statistical measurement utilizing the repetitive embedding of the same additional information Inf is performed in the present embodiment.

The selection of the embedding positions is performed by the embedding position determining unit 0103 shown in FIG. 1. Next, the operation of the embedding position determining unit 0103 is described.

Figure 11:
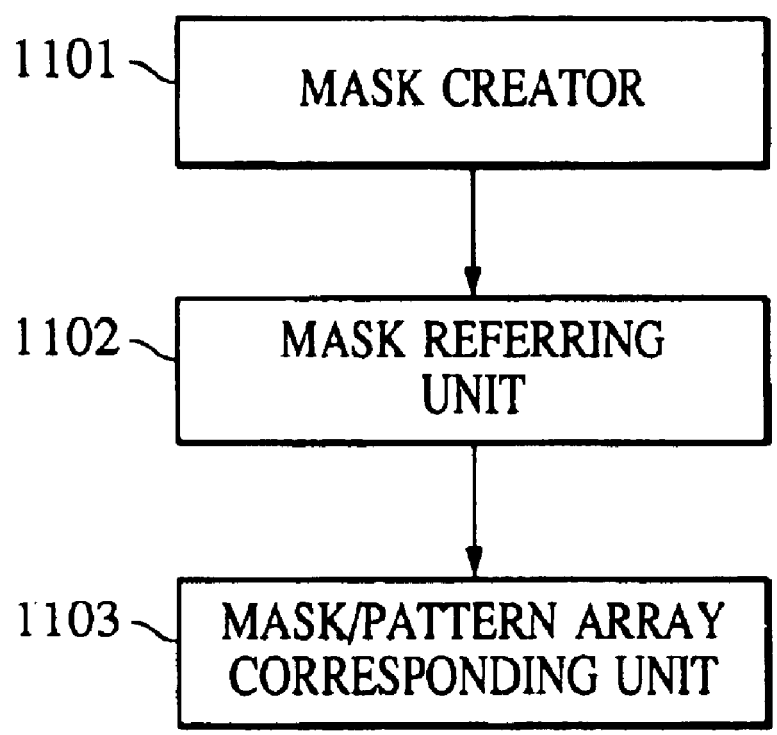
FIG. 11 is a block diagram of an embedding position determining unit.

FIG. 11 shows the internal structure of the embedding position determining unit 0103.

Referring to FIG. 11, a mask creator 1101 creates a mask for specifying the embedding position of each bit of information constructing the additional information Inf. The mask is a matrix provided with positional information specifying a relative placement of the pattern array (see FIG. 9) corresponding to each bit of information.

Figures 17A, 17B:
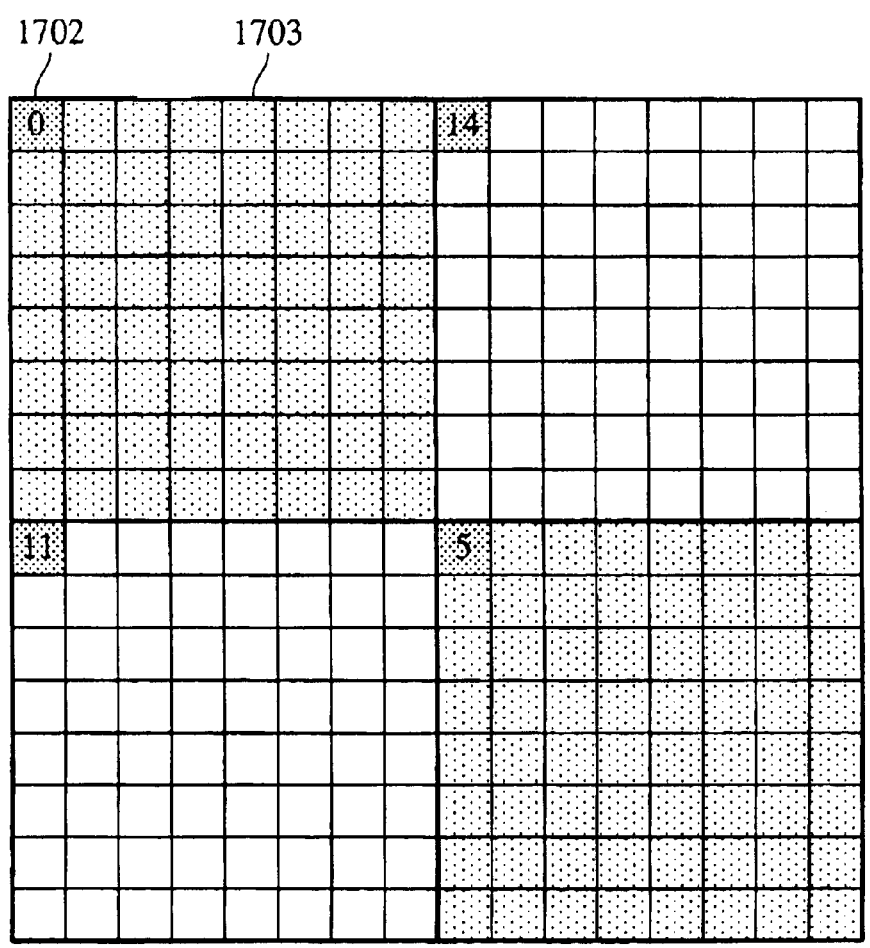
FIGS. 17A and 17B are illustrations of developing each pattern array on the mask shown in FIG. 16.

FIG. 17A shows an example of a mask 1701. Coefficients are allocated to the interior of the mask. Each coefficient has the same frequency of occurrence in the mask. Using the mask, it is possible to embed the additional information Inf having a maximum of sixteen bits.

A mask referring unit 1102 reads the mask created by the mask creator 1101, relates each coefficient in the mask to information indicating that each bit of information is nth bit information, and determines the pattern array placement for embedding each bit of information.

A mask/pattern array corresponding unit 1103 develops the 8×8 array elements of each pattern array at the position of each coefficient in the mask. Specifically, each coefficient (one box) in the mask 1701 shown in FIG. 17A is multiplied by 8×8, as shown by coordinates 1702 in FIG. 17B, thereby providing a referable embedding position for each pattern array.

The additional information embedding unit 0104 refers to the embedding head coordinates 1702 in FIG. 17B and embeds each bit of information using the pattern array.

In the present embodiment, the mask is created every time the image data (blue component) is input to the mask creator 1101. When image data of large size is input, the same additional information Inf is repetitively embedded.

According to the above method, when extracting the additional information Inf from an image, the structure (array of coefficients) of the mask serves as a key. In other words, only the holder of the key can extract the information.

The present invention also covers a case in which, instead of creating a mask in real time, a pre-created mask is stored in an internal storage unit of the mask creator 1101 and the mask is read as circumstances demand. In this case, the processing can quickly move to the next stage.

Next, each process performed in the embedding position determining unit 0103 is described in detail.

The mask creator 1101 is described.

In embedding the additional information Inf using the patchwork method, when information is embedded by greatly manipulating the pixel levels so as to strengthen the resistance against attacks (for example, setting the value c of the pattern array to a large value), deterioration in the image quality is less noticeable in edge portions having a sudden change in the pixel levels in an image represented by the original image data. In contrast, in flat portions in which the pixel levels do not change significantly, portions in which the pixel levels are manipulated are perceived as noise.

Figure 13:
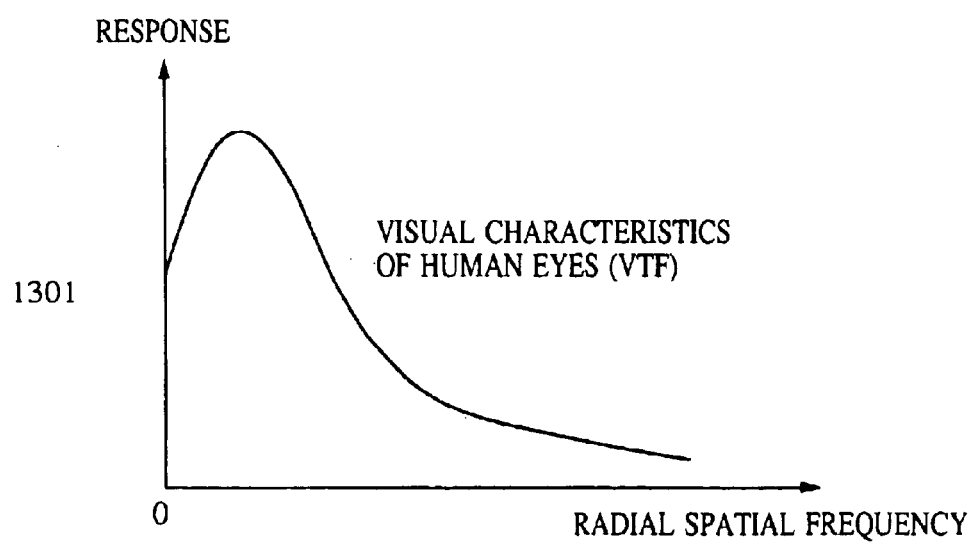
FIG. 13 is a graph of spatial frequency characteristics of human vision.

FIG. 13 shows spatial frequency characteristics perceived by human vision. The horizontal axis represents radial spatial frequency, and the vertical axis represents the visual response. It is understood from FIG. 13 that, when the pixel levels are manipulated and information is thus embedded, deterioration in the image quality is striking in the low-frequency domain to which the human eye is sensitive.

Therefore, the present embodiment takes into consideration characteristics of a blue noise mask and a cone mask generally used in digitizing a multi-level image, and performs pattern placement corresponding to each bit.

The properties of the blue noise mask and the cone mask are briefly described.

First, the characteristics of the blue noise mask are described.

The blue noise mask has a characteristic in which binarization of coefficients included in the mask at any threshold always gives a blue noise pattern. The blue noise pattern is a pattern showing frequency characteristics in which the spatial frequency is biased toward the high-frequency domain.

FIG. 37 shows part of a blue noise mask.

Figure 14A:
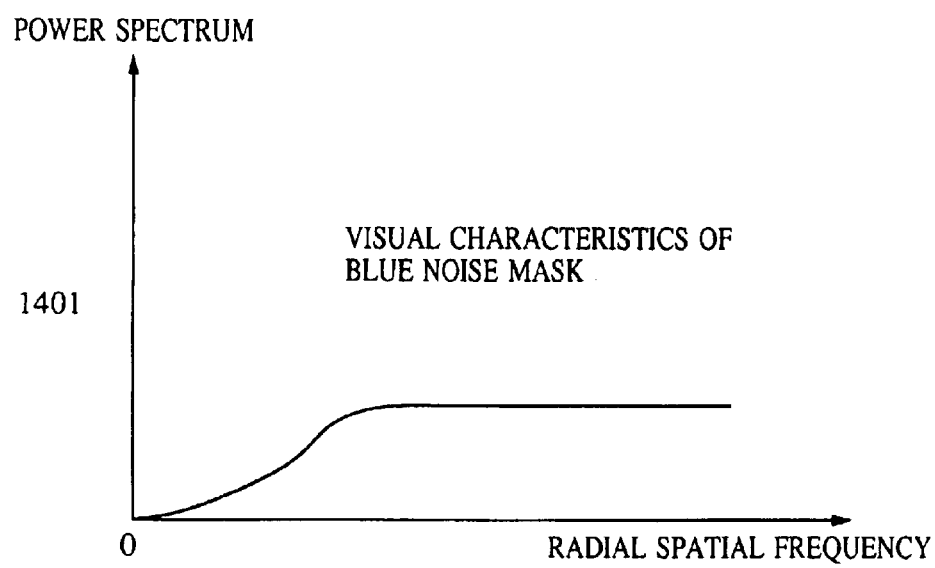
FIGS. 14A and 14B are graphs of spatial frequency characteristics of the blue noise mask and the cone mask.

FIG. 14A illustrates a graph 1401 showing the spatial frequency characteristics of the blue noise mask binarized at a threshold of ten.

The horizontal axis of the graph 1401 represents the radial spatial frequency, indicating a distance from the origin (DC component) when the Fourier transform on the blue noise mask is performed. The vertical axis represents the power spectrum, indicating an average of the squared-sum of the magnitude components at a distance indicated by the radial spatial frequency of the horizontal axis. FIG. 14A shows the two-dimensional frequency characteristics of the image in a one-dimensional graph which is visually easy to understand.

Compared with FIG. 13, the blue noise mask is biased toward the high-frequency components, and it is thus imperceptible to the human eye. Therefore, ink jet printers and the like employ the blue noise mask when expressing the gray scale of a multi-level image by the areal gray scale using dots. In this manner, the spatial frequency component can be biased toward the high frequency, and the areal gray scale can be expressed so that the spatial frequency component is imperceptible to the human eye.

An example of creating a blue noise mask is illustrated.
1. Create white noise.
2. Perform low-pass filtering of a binary image $P_{gl}$ (initial value has a white noise mask) at a gray level g, and create a multi-level image $P'_{gl}$.
3. Compare an image at the gray level g (initial value is 127) and the low-pass-filtered image $P'_{gl}$ (multi-level). Invert black and white pixels of a binary image $P_g$ in the descending order of errors, thus obtaining a binary image $P_{gl+1}$.
4. Repeat steps 2 and 3 until the minimum error is reached, and gradually transform the binary image $P_{gl}$ (initial value has a white noise mask) into the binary image $P_g$ (blue noise mask) at the gray level g (initial value is 127).
5. Provide the image $P_g$ with a binary black or white point at a gray level g+1 or g−1 at a random position, and repeat steps 2 and 3, thus obtaining an image $P_{g+1}$ or $P_{g-1}$.

The above steps are repeated to create blue noise masks at all gray levels, thereby creating a dither matrix.

For example, there in an increase or decrease of four points every gray level in a 32×32 blue noise mask.

In order to obtain 256 gray levels, the black or white bit determined at the previous gray level g cannot be inverted. This imposes harsh restrictive conditions on low and high gray levels. Therefore, the resultant pattern is a random pattern lacking in uniformity.

Figure 12:
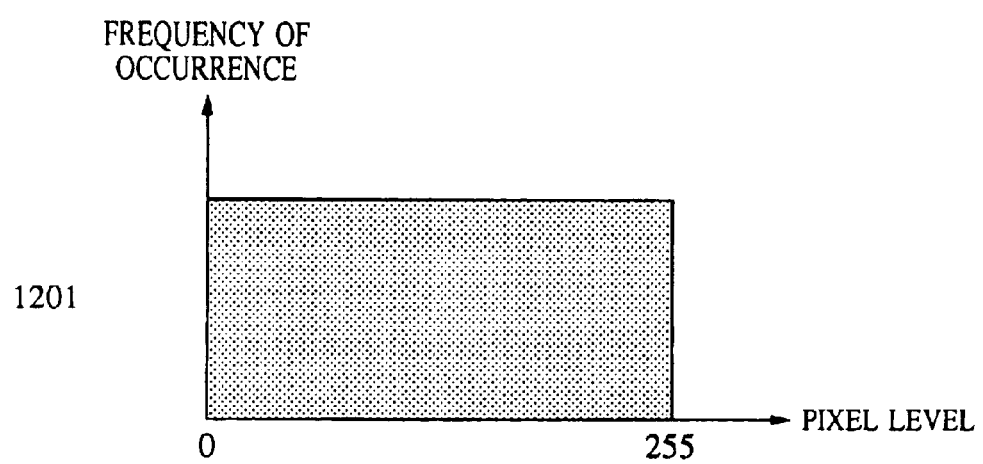
FIG. 12 is a conceptual diagram of a cone mask and a blue noise mask.

FIG. 12 shows a histogram 1201 showing the coefficients constituting the blue noise mask. In FIG. 12, the same numbers of all values (coefficients) 0 to 255 are included in the mask.

Binarization of a multi-level image using the blue noise mask is well known to those skilled in the art. For example, the technique is described in detail by Tehophano Mitsa and Kevin J. Parker in "Digital halftoning technique using a blue noise mask", J. Opt. Soc. Am A, Vol. 9, No. 11, November 1992.

The characteristics of the cone mask are described.

Figure 14B:
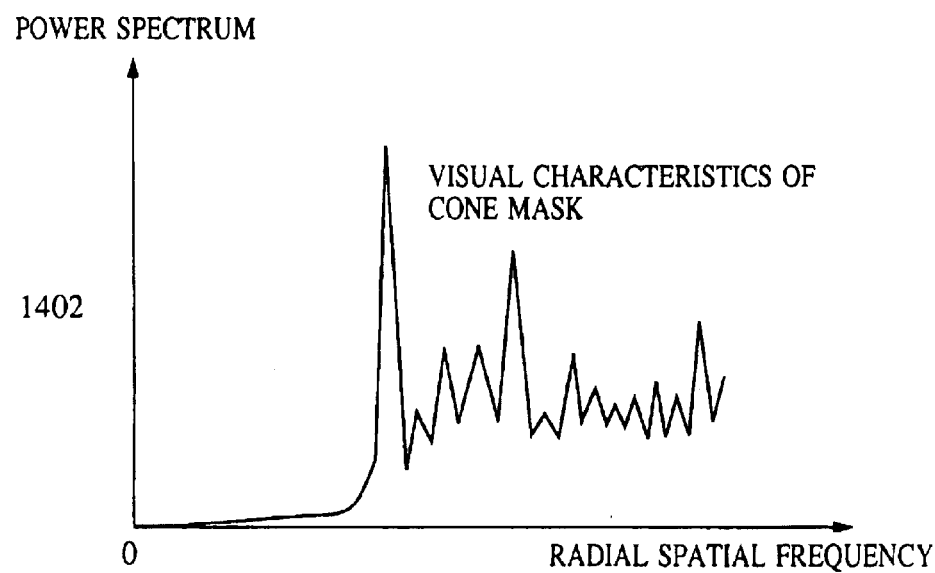

One of the characteristics of the cone mask is that, when coefficients included in the mask are binarized, a periodic or pseudo-periodic peak arises in the spatial frequency domain representing the obtained binary information, as shown in a graph 1402 in FIG. 14B. The cone mask is designed not to give rise to a peak in the low-frequency domain.

FIG. 38 shows part of a coefficient array of a cone mask.

When the cone mask is binarized at any threshold, an appropriate distance is maintained between dots. Hence, no peak arises in the low-frequency domain.

Referring back to FIG. 14B, the graph 1402 shows the spatial frequency characteristics of the cone mask binarized at a threshold of ten. As in the case of the spatial frequency characteristics of the blue noise mask shown by the graph 1401, the graph 1402 illustrates that low-frequency components are sparse.

Compared with the blue noise mask, the cone mask is advantageous in that, whether at a high threshold or at a low threshold, a peak arises at a frequency higher than the low-pass frequency of the blue noise mask, reducing a dense portion at an embedding position. Therefore, noise generated by embedding the additional information Inf is less imperceptible than the blue noise mask.

The frequency of occurrence of the coefficients constituting the cone mask is as shown in the histogram 1201 shown in FIG. 12, which is the same as the blue noise mask.

When the pattern corresponding to each bit of information constructing the additional information Inf is embedded in image data in accordance with the coefficients of the mask, the same number of patterns corresponding to each bit of information can be provided in the image data. As a result, the additional information Inf is uniformly embedded.

In the embodiment, the cone mask is employed as the embedding reference mask since the cone mask is advantageous as described above.

The mask (cone mask) created by the mask creator 1101 is input to the mask referring unit 1102.

The mask referring unit 1102 relates the embedding position at which the N-bit information is embedded in the image to the number (pixel level) of the mask and determines the embedding position.

The embedding position determining processing performed by the mask referring unit 1102 is described.

In the embodiment, the cone mask is used. To make the description simpler, a 4×4 mask 1501 shown in FIG. 15 is used.

Figure 15:
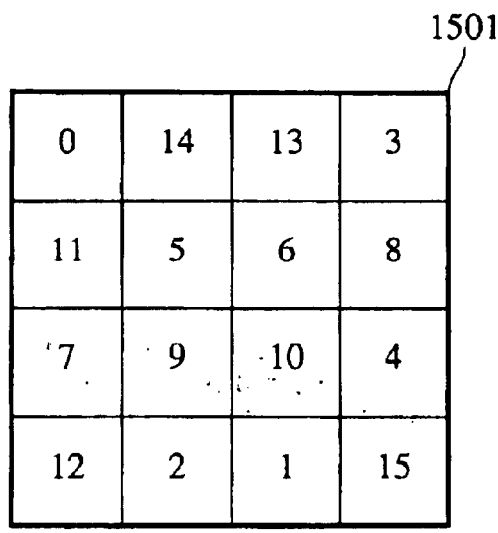
FIG. 15 is an illustration of a position reference mask.

The mask 1501 shown in FIG. 15 has 4×4 coefficients, and the coefficients 0 to 15 are each placed once. Using the 4×4 mask 1501, reference to the embedding position of the additional information Inf is made. The mask used in the description is capable of embedding the additional information Inf having a maximum of sixteen bits. In the following description, an example of the additional information Inf having eight bits is described.

Referring to FIG. 36, the structure of the additional information Inf is described. As shown in FIG. 36, the additional information Inf includes start bits $Inf_1$ and utilization information $Inf_2$.

The start bits $Inf_1$ are used by an offset adjusting unit 2002 included in the digital watermark extracting unit to recognize that the actual position at which the additional information Inf is embedded is away from an ideal position, and to correct the starting position for extracting the digital watermark, that is, the additional information Inf, in accordance with the recognition. This is described in detail below.

The utilization information $Inf_2$ is information actually utilized as additional information in the image data I. When it is aimed to track the cause of illegal usage of the image data wI, the utilization information $Inf_2$ includes an ID of the device shown in FIG. 1 or a user ID. When it is aimed at prohibiting copying of a printed image of the image data wI, the utilization information $Inf_2$ includes control information indicating that copying is prohibited.

In the present embodiment, the start bits have five bits and use a bit string "11111". However, the present invention is not limited to this. For the start bits of the additional information Inf, it is possible to use start bits having a number of bits other than five bits. Similarly, it is possible to use a bit string other than the bit string "11111". The number of bits and the bit string of the start bits need to be shared by the digital watermark embedding unit and the digital watermark extracting unit.

In the following description, an example of using the cone mask constituted of 4×4 coefficients to embed the additional information Inf having a total of eight bits including the 5-bit start bits and the 3-bit utilization information is described.

However, the present invention is not limited to the above example. The present invention is applicable to, for example, a case in which a 32×32 cone mask is used to embed additional information Inf having 69 bits including 5-bit start bits and 64-bit utilization information.

As described above, the additional information Inf in the embodiment has the 5-bit start bits "11111" and the 3-bit utilization information. A first bit has bit information 1, a second bit has bit information 1, a third bit has bit information 1, a fourth bit has bit information 1, a fifth bit has bit information 1, a sixth bit has bit information 0, a seventh bit has bit information 1, and an eighth bit has bit information 0.

The pattern (see FIG. 9) corresponding to each of the bits is allocated to a position corresponding to each of the coefficients included in the cone mask. In accordance with the positional relationship, each pixel level of the original image data is converted by ±c. Accordingly, one piece of additional information Inf is embedded in the original image data of a size corresponding to one cone mask.

In the present embodiment, a threshold is determined based on the minimum number of bits required for embedding the additional information Inf. At a position in the cone mask having a coefficient not greater than the threshold, the corresponding bit information is embedded. Independent of the number of bits of the additional information Inf, one piece of additional information Inf is embedded in each cone mask.

The present invention is not limited to the above method. Alternatively, the corresponding bit information can be embedded at a position provided with a coefficient not smaller than a certain threshold. This can be used as presupposition to determine the threshold.

In the present embodiment, the ratio of the number of coefficients not more than the threshold used for embedding to the number of all coefficients included in the mask is referred to as the embedding filling factor.

In order to reliably embed the 8-bit additional information Inf for a certain integer number of times, it is necessary to set a threshold for determining which coefficient is used as an embedding reference position in the mask 1501 shown in FIG. 15 to eight or sixteen. The threshold is appropriately determined taking into consideration effects on the resistance and the image quality.

When the threshold of the mask is set to eight, the embedding filling factor is 50%. Specifically, 50% of the original image data to which the mask is related is to be processed using the pattern array shown in FIG. 9.

Table 1 shows an example of the corresponding relationship between the bit information and the coefficients included in the mask:

TABLE 1

| Order of bits of information to be embedded | S1 | S2 | S3 | S4 | S5 | 1 | 2 | 3 |
|---|---|---|---|---|---|---|---|---|
| Coefficients included in mask | 0 | 1 | 2 | 3 | 4 | 5 | 6 | 7 |

Table 1 includes bit information (start bits) S1 to S5 which are used to adjust the positions by the offset adjusting unit 2002, and 3-bit utilization information 1 to 3.

Figure 16:
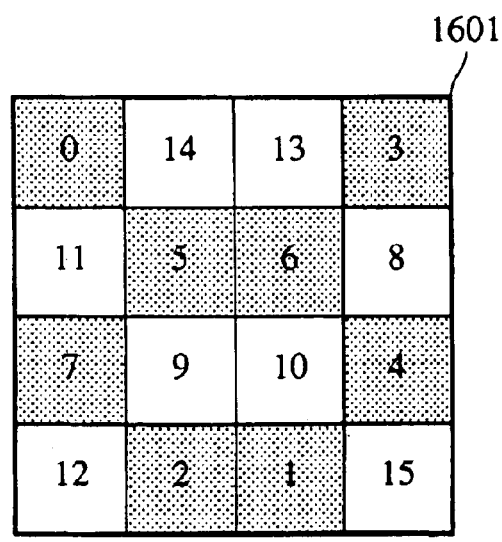
FIG. 16 is a conceptual diagram of embedding positions in the position reference mask.

In accordance with Table 1, each bit of information is embedded using the pattern (see FIG. 9) at positions of pixels of input image data corresponding to positions of coefficients 0 to 7 shown by a mask 1601 in FIG. 16. The corresponding relationship between the order of bit information to be embedded and the coefficients in the mask is part of the key information. Each bit of information cannot be extracted without knowing the corresponding relationship. The present embodiment simplifies the description by using the corresponding relationship as shown in Table 1 that the bit information S1 to S5 and the 3-bit utilization information correspond to coefficients from 0 to the threshold.

When the 32×32 cone mask is used to embed the information, the filling factor is as described below. The processing steps are the same as when using the mask 1501.

First, a threshold for reliably embedding the additional information Inf a certain integer number of times is determined taking into consideration deterioration in the image quality caused by embedding.

In order that bits constituting the additional information Inf are embedded for the same number of repetitions, the number of coefficients not greater than the threshold is divided by the number of bits N constituting the additional information Inf. Hence, the number of repetitions each bit is embedded in one mask is determined.

For example, when embedding the 69-bit additional information Inf including the series of 5-bit start bits and the 64-bit utilization information in the original image data corresponding to coefficients 0 to 255, the threshold is set to, for example, 137.

In this case, the number of effective coefficients in the mask is 138. Since the number of bits required to express one piece of additional information Inf is 69, each bit of information can be embedded 138/69=2 times in one mask.

When determining the embedding positions using the cone mask, the information is embedded in all points having coefficients not larger than a certain threshold. This is because the present embodiment aims to make best use of the characteristics of the cone mask that no peak arises in the low-frequency component of the spatial frequency.

As a result of determining the embedding positions as described above, when the embedding filling factor is 50% and the embedding information has 69 bits, the relationship between the bits of information constructing the additional information Inf and the coefficients constructing the cone mask is as shown in Table 2:

TABLE 2

| Order of bits of information | S1 | S2 | S3 | S4 | S5 | 1 | 2 | ... | 64 |
|---|---|---|---|---|---|---|---|---|---|
| Coefficients in cone mask | 0, 1 | 2, 3 | 4, 5 | 6, 7 | 8, 9 | 10, 11 | 12, 13 | ... | 136, 137 |

Table 2 includes start bits S1 to S5 which are used for adjusting the positions by the offset adjusting unit 2002, and utilization information 1 to 64.

The present invention is not limited to the above relationship. As long as each bit of information is embedded in all coefficients from zero to the threshold, namely from zero to the 255, using the pattern shown in FIG. 9, the corresponding relationship between the bit information and the coefficients can be different from the above relationship.

When the 32×32 mask is used, the same coefficient is allocated to four positions in one mask.

When embedding the bit information in the original image data based on the corresponding relationship illustrated in Table 2, each bit of information constructing the additional information Inf is embedded substantially the same number of times in a cone mask of large size, such as a 32×32 cone mask or a 64×64 cone mask. The same bit information can be uniformly dispersed in the original image data.

The patchwork method randomly selects the embedding positions. The present embodiment is as advantageous as the patchwork method by referring to the cone mask. In addition, deterioration in the image quality is suppressed.

As a result, the mask referring unit 1102 obtains the coordinates (x, y) of the embedding position corresponding to each bit of information.

The bit information can be expressed by an array S[bit][num]=(x, y) where bit indicates, in the case of Table 1, the start bits S1 to S5 and the utilization information bits 1 to 3, num indicates the order of the coefficients which repetitively appear in the cone mask, and (x, y) indicates the relative coordinates in the mask.

The above processing steps are performed by the mask referring unit 1102.

The embedding position of each bit of information in the cone mask obtained by the mask referring unit 1102 is input to the mask/pattern array corresponding unit 1103.

The embedding position determined by the mask referring unit 1102 corresponds to positions of 8×8 pixels in a pattern of each bit of information. The patchwork method allocates addition regions (+c), subtraction regions (−c), and the other regions (0) to the determined embedding position. For all the positions of the cone mask referred to by the mask referring unit 1102, the mask/pattern array corresponding unit 1103 performs 8×8 pattern-array development as shown in FIG. 9.

Specifically, for the coordinates of the array S[bit][num]=(x, y) obtained by the mask referring unit 1102, the x coordinate is multiplied by the horizontal size of the pattern array, and the y coordinate is multiplied by the vertical size of the pattern array. As a result, the coordinates 1701 in the mask shown in FIG. 17A are transformed into the head coordinates 1702 shown in FIG. 17B in which one pixel in the mask is enlarged to one pattern array.

Figure 19:
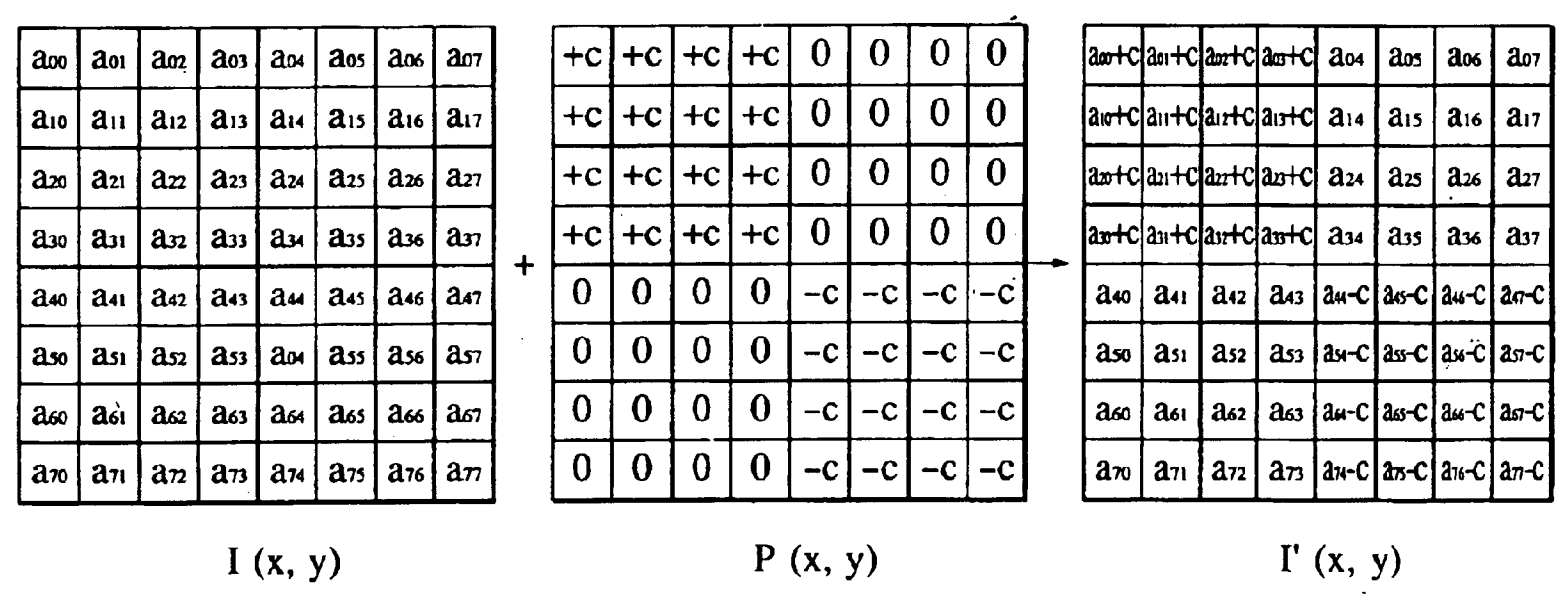

A pattern array shown in FIG. 19 is used, and the pattern array development is performed starting from the head coordinates 1702. As a result, embedding is successfully performed in a region 1703 of the size of the pattern array without any overlapping portion.

The coordinates (x, y) are transformed into coordinates (x', y'), whereas bit and num in the array S[bit][num] remain unchanged.

Therefore, the additional information Inf corresponding to bit in the array S[bit][num] is used as the head position for embedding the pattern array, and a plurality of bits of information can be embedded.

A mask obtained by developing (expanding) each coefficient in the cone mask by the mask/pattern array corresponding unit 1103 to the 8×8 pattern array is referred to as an expanded mask.

The size of the expanded mask is (32×8) by (32×8). This size is a minimum image unit (referred to as a macro block) for embedding at least one piece of additional information Inf.

The above processing is performed by the mask/pattern array corresponding unit 1103.

In general, a smaller mask has a smaller degree of freedom in placing dot positions when creating the mask than a larger mask. It is thus difficult to create a mask having desired characteristics, such as a cone mask. For example, when the additional information Inf is embedded by repetitively allocating a small mask to the entire image data, the spatial frequency of the small mask is perceived in the entire image data.

In contrast, the complete additional information Inf is extracted from one mask. By setting the size of a mask to a large value, the resistance against cutting (the possibility of extracting the additional information Inf from partial image data wI') becomes low. Therefore, it is necessary to determine the size of a mask by considering the balance between the resistance against cutting and the deterioration in the image quality.

The above processing is performed by the embedding position determining unit 0103.

The additional information embedding unit 0104 refers to the embedding position of each bit of information in the image data and embeds the additional information Inf.

Figure 10:
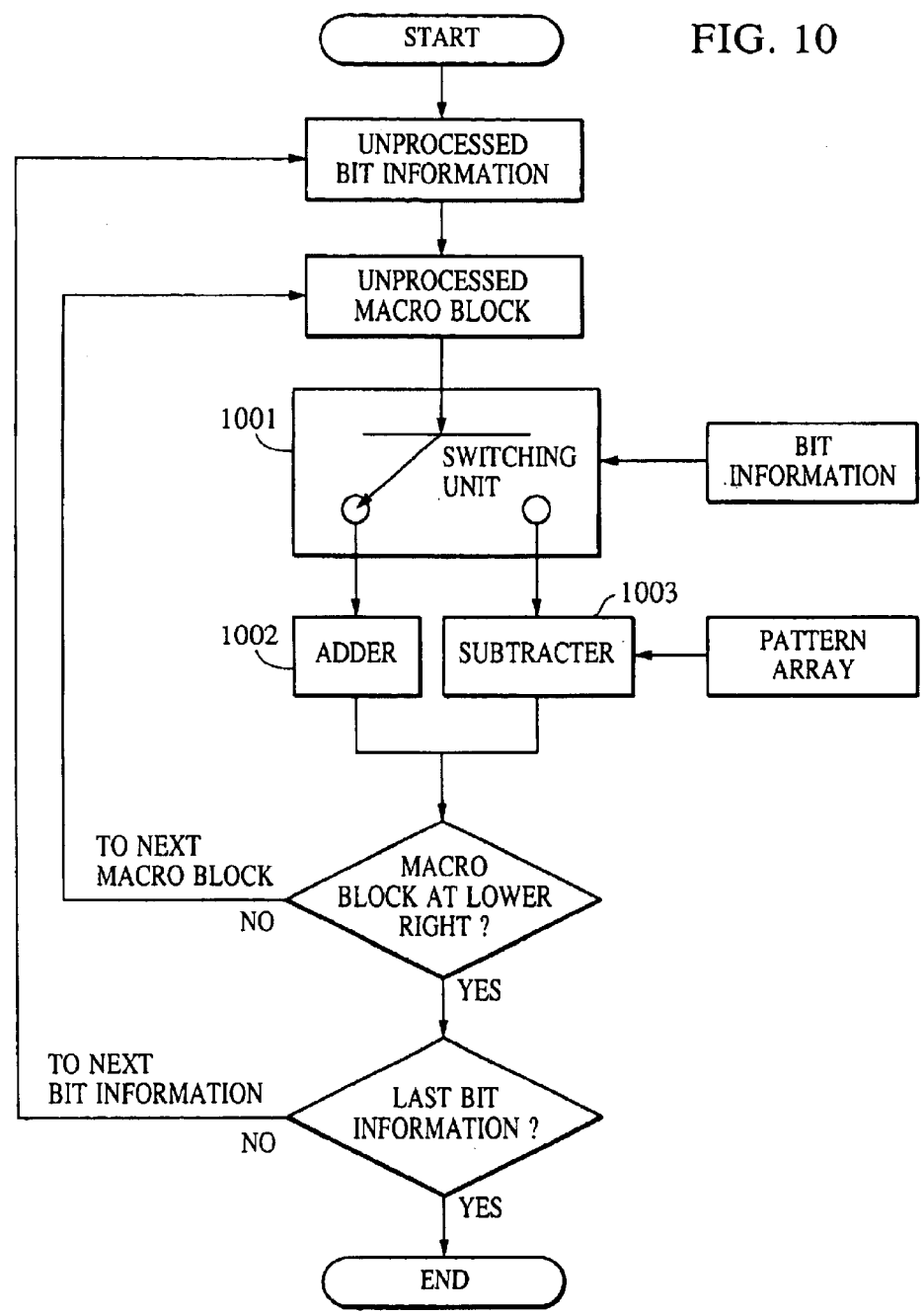
FIG. 10 is a flowchart showing a process of embedding additional information.

FIG. 10 shows the additional information embedding unit 0104 which repetitively embeds the additional information Inf.

Referring to FIG. 10, a plurality of allocable macro blocks are allocated to the entire image. A first bit of information is embedded in all the macro blocks, a second bit of information is embedded in all the macro blocks, a third bit of information is embedded in all the macro blocks, and so forth. Hence, the bits of information are repetitively embedded. Specifically, when there is a bit of information that is not embedded, that bit of information is embedded in all unprocessed macro blocks by embedding steps performed by a switching unit 1001, an adder 1002, and a subtracter 1003.

The present invention is not limited to the above processing steps. The relationship between the two loop processing steps may be reversed. In other words, when there are any unprocessed macro blocks, all the bits of information that are not embedded may be embedded in the unprocessed macro blocks.

When each bit of information to be embedded is one, the additional information Inf is embedded by adding the pattern array shown in FIG. 9. When the bit of information to be embedded is zero, the pattern array shown in FIG. 9 is subtracted, that is, the inverse of the pattern array shown in FIG. 9 is added.

The above addition and subtraction are performed by controlling the switching unit 1001 in accordance with the bit information to be embedded. Specifically, when the bit information to be embedded is one, the switching unit 1001 is connected to the adder 1002. When the bit information to be embedded is zero, the switching unit 1001 is connected to the subtracter 1003. The switching unit 1001, the adder 1002, and the subtracter 1003 perform the processing steps by referring to the information concerning the bit information and the pattern array.

FIG. 19 illustrates an example of embedding one bit of information which is one. In this case, the pattern array is added.

In the example shown in FIG. 19, I(x, y) indicates the original image, and P(x, y) indicates an 8×8 pattern array. Coefficients included in the 8×8 pattern array are superimposed on the original image data (blue component) of the same size as the pattern array. The addition and subtraction processing at the same position is performed. As a result, I'(x, y) is computed. The resultant I'(x, y) is output as the image data of the blue component in which the bit information is embedded to the color component synthesizer 0105 shown in FIG. 1.

The above addition and subtraction processing using the 8×8 pattern array is repetitively performed at all the embedding positions (positions to which the pattern array is allocated for embedding each bit of information) determined by Table 2.

Figure 18A:
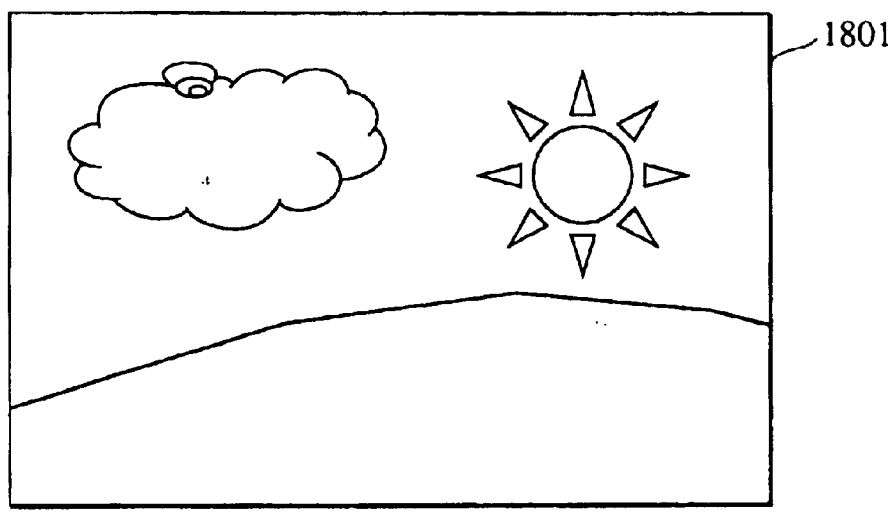
FIGS. 18A and 18B are illustration of a region required for embedding additional information Inf in the entirety of an image.
Figure 18B:
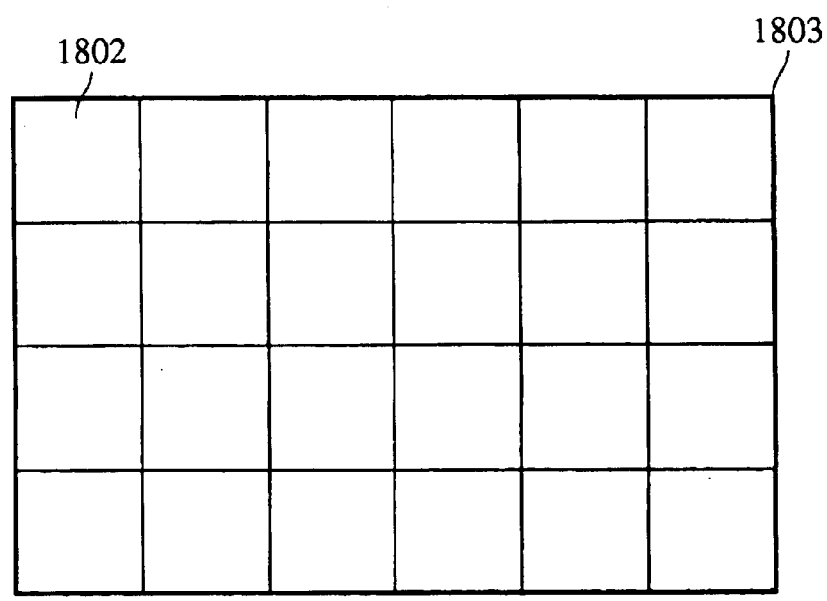

Referring now to FIGS. 18A and 18B, the loop processing in FIG. 10 is illustrated.

In order to repetitively embed each bit of information, macro blocks 1802 are repetitively allocated to the entirety of image data 1801 (1803), starting from the upper left to the lower right in the raster order. This processing corresponds to the processing steps performed by the switching unit 1001, the adder 1002, and the subtracter 1003.

The above processing is performed by the additional information embedding unit 1014, and the additional information Inf is embedded in the entire image.

Accordingly, the additional information Inf is embedded in the image data. When each pixel of the image data in which the additional information Inf is embedded can be expressed by a sufficiently small number of ink dots, the pattern array is sufficiently reduced in size. Hence, each pattern array is perceived by human vision to be a tiny dot. The spatial frequency characteristics of the cone mask are maintained, and the cone mask is substantially imperceptible to the human eye.

In the present embodiment, subsequent to embedding the additional information Inf by the additional information embedding unit 0104, the file is compressed, stored in the memory 0107, and then decompressed.

Figure 39:
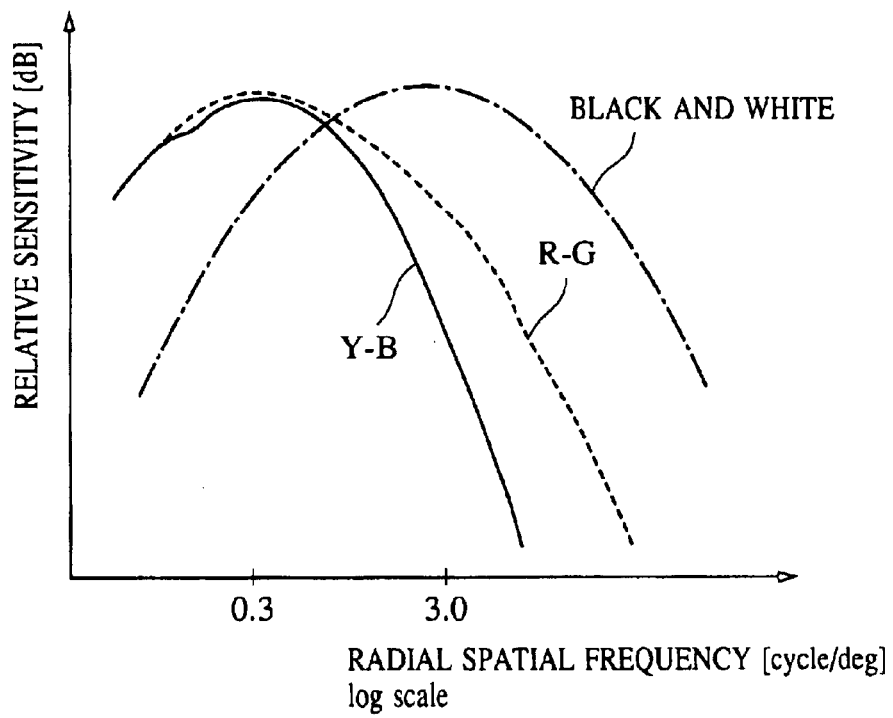
FIG. 39 is a graph of chromatic spatial frequency characteristics of human vision.

FIG. 39 shows a graph of chromatic spatial frequency characteristics of human vision. Three curves are obtained using spatial sinusoidal waves formed by black and white (monochrome), and red and green, and yellow and blue which are opposite color pairs of uniform brightness. By changing the period and contrast of each spatial sinusoidal wave pattern, the perceptible limit of human vision is measured.

Referring to FIG. 39, the sensitivity to black and white (brightness information) reaches a maximum at about 3 cycle/deg. The sensitivity to chromaticity (red and green, and yellow and blue) reaches a maximum at about 0.3 cycle/deg.

It can be concluded from the above measurement results that the brightness information is sensitive to fine portions determined by the image resolution and so on, whereas the chromaticity has an effect on visibility in spatially large regions in which the spatial frequency is low.

Also, the yellow and blue pattern is not as influential as the red and green pattern in identifying the fine spatial information.

Hence, embedding digital watermark information in a gray scale image which only has a brightness component by modulating the image as it is is less advantageous than embedding the digital watermark information in a color component of color image data because deterioration in the image quality is more perceptible in the gray-scale image. When embedding the digital watermark information in the color image data having R, G, and B components, it is preferable to embed the digital watermark information in the blue component (B) since it is least perceptible to human vision.

When the color component is changed in order to embed the digital watermark information in the color component, the digital watermark information is perceptible to the human eye as uneven color in spatially large regions in which the spatial frequency is low. In contrast, it is less perceptible to the human eye in spatially narrow regions in which the spatial frequency is high compared with embedding the digital watermark information in the brightness component.

According to the embodiment, the gray-scale image in which each pixel has one type of component is first converted into color image data in which each pixel has a plurality of components, and then the digital watermark information, such as the additional information Inf, is embedded. Therefore, deterioration in the image quality is suppressed compared with embedding the digital watermark information in the normal, unconverted gray-scale image.

A comparison between the case of embedding the digital watermark information in the gray-scale image and the case of embedding the digital watermark information in one component among the components forming the color image data demonstrates that the latter case is more advantageous in retaining the image quality when outputting an image at high resolution, that is, when expressing the gray scale of a pixel level by fewer ink dots.

A drawback of the above case is that the file size of the output color image data is approximately three times as large as the original image data.

In order to suppress the file size as much as possible, the JPEG compressor/encoder 0106 performs JPEG compression and encoding of the digitally watermarked image data.

In general, a JPEG compression and encoding technique utilizes human visual characteristics. By removing a component to which human vision is imperceptible, the JPEG compression and encoding technique reduces the amount of data. In contrast, a digital watermarking technique embeds information in a component to which human vision is imperceptible. Therefore, it is difficult for the JPEG compression and encoding technique and the digital watermarking technique to coexist. The JPEG compression and encoding technique is regarded as a type of attack on the digital watermark information.

In the following description, a method for achieving the resistance against JPEG compression and encoding is described.

The pattern array as shown in FIG. 9 to be used in the embodiment is designed so that the additional information embedded in the color image data is not lost by sub-sampling chrominance components and quantization.

The JPEG compression and encoding system is briefly described.

The color image data input to the JPEG compressor/encoder 0106 is converted into brightness (Y) and chrominance (Cr and Cb) components. When color image data formed by the original red component (R), the green component (G), and the blue component (B) is input, the following equations are used to perform conversion of the data into other color image data formed by the brightness (Y) and chrominance (Cr and Cb) components:

$$Y = 0.29900 \times R + 0.58700 \times G + 0.11400 \times B$$

$$Cr = 0.50000 \times R - 0.41869 \times G - 0.08131 \times B$$

$$Cb = -0.16874 \times R - 0.33126 \times G + 0.50000 \times B \qquad (5)$$

Figure 40:
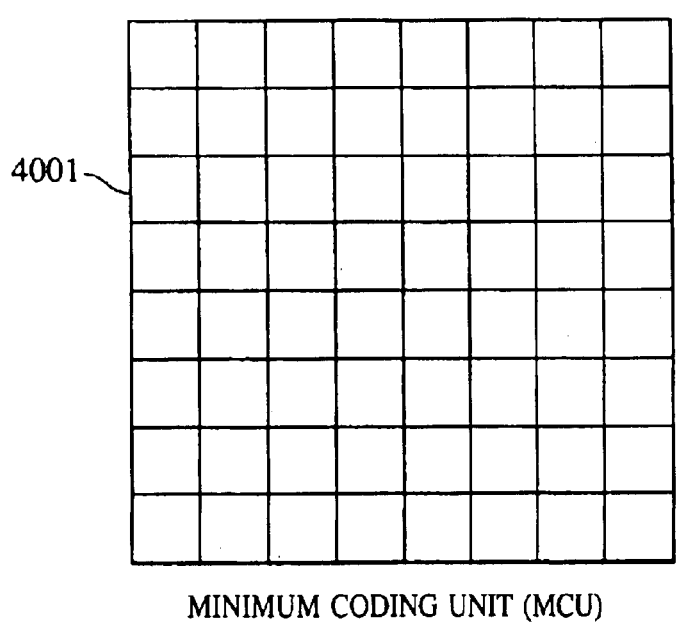
FIG. 40 is an illustration of the minimum coding unit in the Joint Photographic Experts Group (JPEG) mode.

The image data separated into the brightness component and the chrominance components is split into blocks of 8×8 pixels starting from the upper left of the image in the raster order, as shown in FIG. 40. The JPEG compression and encoding is repetitively performed every 8×8 blocks.

The sampling processing of the color components performed in the JPEG compression and encoding system is described.

Figure 41A:
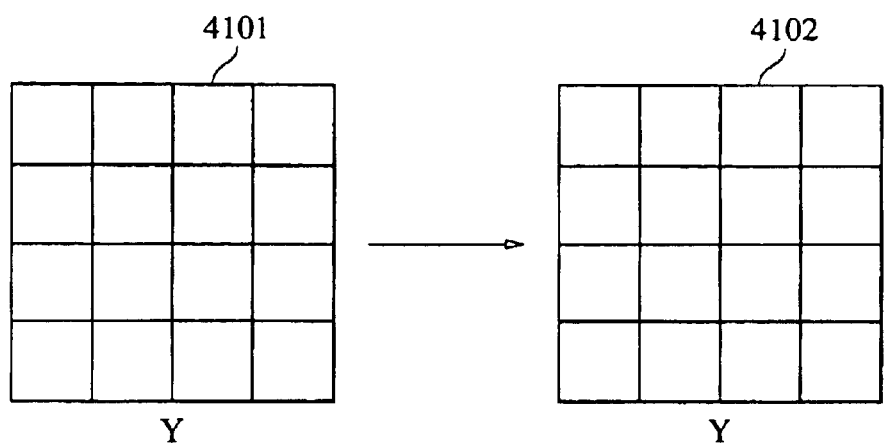
FIGS. 41A and 41B are illustrations of sampling of brightness and chrominance components in the JPEG mode.
Figure 41B:
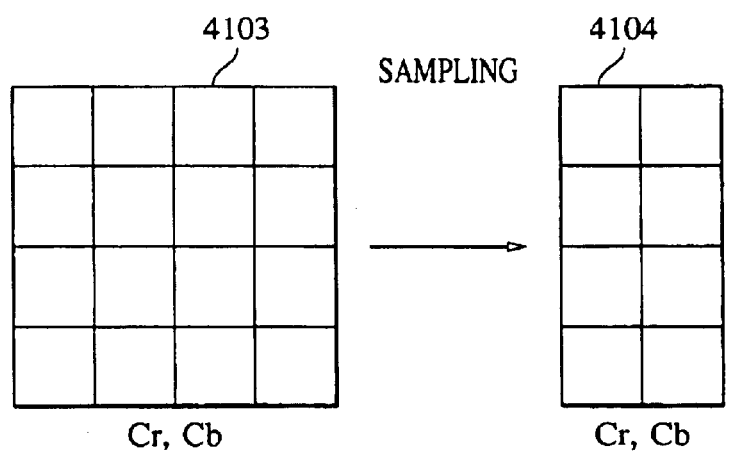

FIGS. 41A and 41B illustrate sampling of image data. 4:2:2 sampling steps performed in the JPEG compression and encoding system are described below.

FIG. 41A shows a brightness component having 4×4 pixels 4101. Since visually important information is included in the brightness component, decimation is not performed on the brightness component. The 4×4 pixels 4101 remains unchanged and is output as 4×4 pixels 4102.

FIG. 41B shows chrominance components (Cr and Cb) having 4×4 pixels 4103. Since information included in the chrominance components is not very important visually, decimation is performed on the chrominance components in which two pixels are decimated to one pixel in the horizontal or the vertical direction. As a result, the chrominance components (Cr and Cb) having 4×4 pixels 4103 are converted into 4×2 pixels 4104. Accordingly, the 8×8 pixels of the chrominance components are reduced to 8×4 pixels.

As a result of 4:2:2 sampling, the brightness component Y and the chrominance components Cr and Cb having the 8×8 pixels become the 8×8-pixel brightness component Y and the 8×4-pixel chrominance components Cr and Cb, respectively. On each of the sampled pixels, discrete cosine transform (DCT) computation, quantization, zigzag scanning, and Huffman coding are performed using conventional techniques.

Taking advantage of the fact that the human visual characteristics are not very sensitive to high-frequency components, the JPEG technique efficiently compresses data by reducing the number of quantizing steps for high-frequency components of DCT coefficients. Quantization is performed so that the number of quantizing steps is reduced for the chrominance components compared with the brightness component.

The pattern array having resistance against the above compression and encoding is described.

Referring to FIG. 42, the pattern array shown in FIG. 9 is again illustrated. A region 4201 having positive elements +c is referred to as a positive patch, and a region 4202 having negative elements −c is referred to as a negative patch. In each patch, information is biased toward low-frequency components in a minimum coding unit (MCU) 4001 having 8×8 pixels shown in FIG. 40, thereby strengthening the resistance against JPEG compression. The present invention is not limited to this, and also covers a case in which the MCU has 16×16 pixels.

When sampling at 4:1:1 (decimating a chrominance component every other pixel in the vertical and horizontal directions) or 4:2:2 (decimating a chrominance component every other pixel in the vertical direction or the horizontal direction), the resistance against sampling is strengthened by increasing the size of each patch by two multiplied by an integer number of pixels in the vertical and/or horizontal direction in accordance with sampling.

Specifically, (1) each patch is biased toward the low frequency in the MCU (8×8 pixels) and (2) the size of each patch is 2×N (N is an integer) pixels in the vertical and/or horizontal direction in accordance with the sampling method.

In each region having 8×8 pixels to be compressed and encoded using the JPEG technique, in order that each patch has low-frequency components, it is preferable that the position of the image at which the pattern array is allocated and the size of the pattern array (in FIG. 9, 8×8 pixels) are in synchronism with each region to be encoded.

Specifically, (3) the size of the pattern array and the embedding position are in synchronism with the unit size to be compressed and encoded by the JPEG technique.

Taking the above conditions into consideration, the additional information Inf is embedded using the pattern array as shown in FIG. 9. Accordingly, the digital watermark information, that is, the additional information Inf, is retained in the image data even after the image data is compressed and encoded using the JPEG technique. Hence, the image data has resistance against JPEG compression and encoding.

The present invention also covers a case in which the color component extracting unit 0101 directly converts the gray-scale (monochrome) image into the brightness component Y and the chrominance components Cr and Cb, and the additional information Inf or the like is embedded as the digital watermark information in the component Cb. In this case, the JPEG compressor/encoder 0106 need not perform conversion into the brightness component and the chrominance components. Hence, the number of processing steps is reduced.

Also the present invention covers a case in which the color component extracting unit 0101 directly converts the gray-scale (monochrome) image into yellow (Y), magenta (M), cyan (C), and black (K) components, and the additional information Inf or the like is embedded as the digital watermark information only in the Y component. This case eliminates a step of converting the color components immediately before printing.

The present invention is not limited to the above cases in which embedding is performed in the blue component, the Cb component, and the Y component. The present invention is also applicable to a case in which the additional information Inf or the like is embedded in part of all the components constructing one pixel.

Coded data obtained by the above JPEG compression and encoding processing is temporarily stored in the memory 0107. The coded data is read from the memory 0107 to the JPEG decompressor/decoder 0108 with a timing for transmitting to an external device or a timing for printing by a printer connected at the subsequent stage of the device shown in FIG. 1.

According to the present embodiment, coded data obtained by converting gray-scale image data into color image data, modulating a blue component, further converting the data into color image data formed of brightness and chrominance components, and finally compressing the color image data using the JPEG system is advantageous compared with coded data obtained by directly converting the original gray-scale data into the color image data formed of the brightness and chrominance components and compressing the color image data using the JPEG system. The former coded data is advantageous since there is not a significant increase in the memory capacity, although there is a slight increase in the amount of data of the chrominance components.

Specifically, the digital watermark information is embedded in the original image data, and then the image data is compressed using the JPEG compression and encoding system. This method of embedding the digital watermark information in the gray-scale image data according to the present embodiment is advantageous compared with the method of modulating the gray-scale image and embedding the digital watermark information in that the image quality is improved while there is not a significant increase in the total amount of data.

The JPEG decompressor/decoder 0108 reads the coded data from the memory 0107 with a timing for transmitting to an external device or a timing for printing by a printer connected at the subsequent stage, and decodes the color image data using the reverse processing steps of the above compression processing steps.

Referring now to FIG. 2, the registration unit 0202 included at the digital watermark extraction unit side is described in detail.

The registration unit 0202 is provided before the additional information extracting unit 0203 and performs preliminary processing of extracting the additional information Inf. An image of the blue component extracted by the color component extracting unit 0201 is input to the registration unit 0202.

The registration unit 0202 compensates for the difference in scales of the image data wI output from the digital watermark embedding unit and the image data wI' input to the digital watermark extracting unit.

Figure 7:
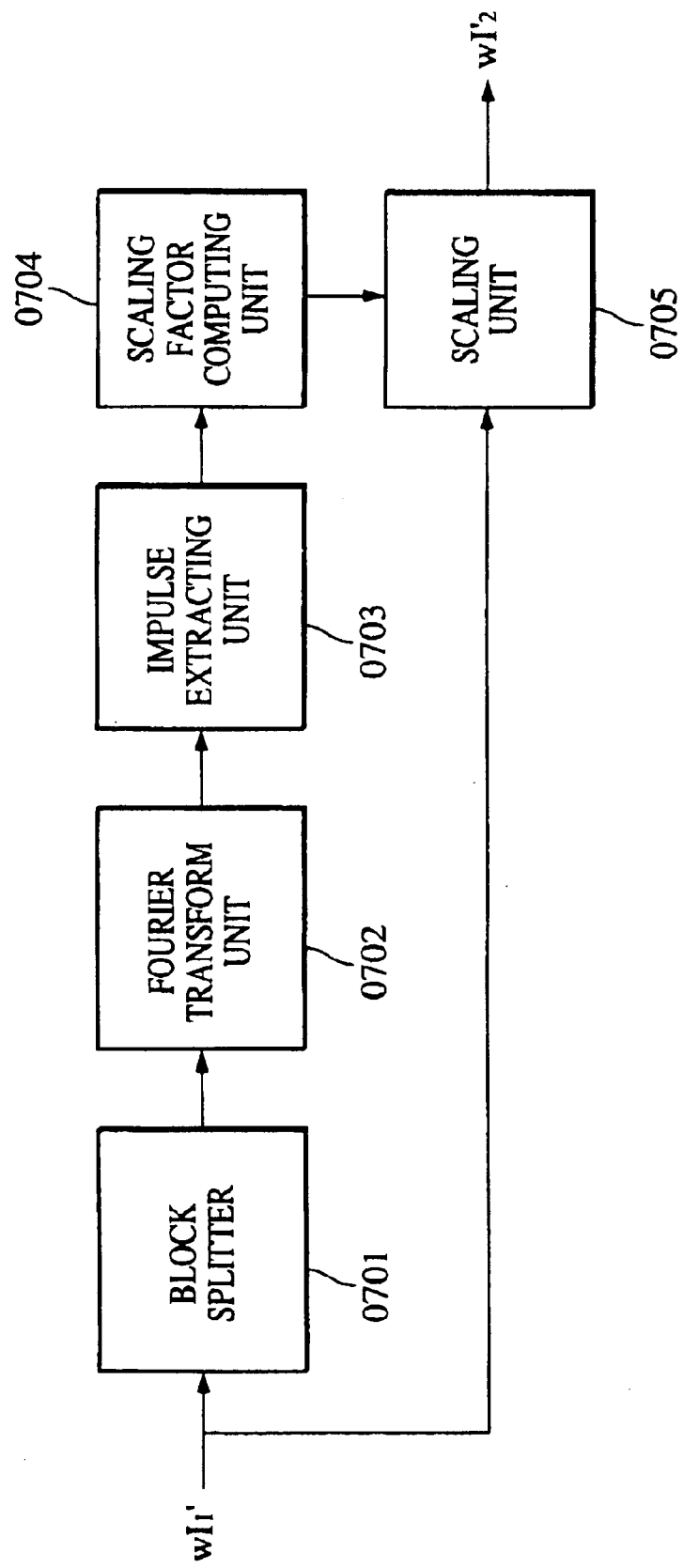
FIG. 7 is a block diagram of a scale adjusting unit.

FIG. 7 illustrates the registration unit 0202 in detail. As shown in FIG. 7, the registration unit 0202 includes a block splitter 0701, a Fourier transform unit 0702, an impulse extracting unit 0703, a scaling factor computing unit 0704, and a scaling unit 0705.

The block splitter 0701 splits the data into blocks, which is similar to the processing performed by the block splitter 0401 included in the registration signal embedding unit 0102. With the processing performed by the block splitter 0701, it is generally difficult to extract blocks similar to those obtained by the block splitter 0401 in the registration signal embedding unit 0102. Because the image data wI in which the digital watermark information Inf is embedded is processed by a printer, the size is changed and the positions are further shifted.

However, extraction of these blocks need not be perfectly accurate since the registration signal is embedded in the magnitude spectrum of the image data by the digital watermark embedding unit. The magnitude spectrum has a characteristic that it is not influenced by shifting of a position in the spatial domain of image data. Therefore, no problem occurs when the blocks split by the block splitters in the electric watermark embedding unit and the electric watermark extracting unit are somewhat displaced.

The block splitter 0701 outputs the image data which is split into blocks to the Fourier transform unit 0702. The Fourier transform unit 0702 transforms the image data in the spatial domain into image data in the frequency domain, which is similar to processing performed in the registration signal embedding unit 0102. The image data in the frequency domain obtained by the Fourier transform is expressed by the magnitude spectrum and the phase spectrum. Only the magnitude spectrum is input to the impulse extracting unit 0703, while the phase spectrum is discarded.

The transformed image data in the frequency domain is input to the impulse extracting unit 0703. The impulse extracting unit 0703 only extracts impulse signals from the transformed image data in the frequency domain. Specifically, the impulse extracting unit 0703 extracts the impulse signals 0502 to 0505 shown in FIG. 5 which are embedded in the image data.

This can be performed using a conventional image processing technique. For example, the transformed image data in the frequency domain is processed using a threshold, as shown in FIG. 8A. Referring to FIG. 8A, a magnitude spectrum 0801 input to the impulse extracting unit 0703 is processed using a threshold 0802. In order to simplify the description, the transformed image data in FIG. 8A is expressed in one dimension. By appropriately selecting the threshold 0802, the impulse signals can be extracted. At the same time, however, portions of the image data having the same size as the impulse signals at the low frequency are also extracted.

FIG. 8B shows a method for solving the above problem. A quadratic differential is performed on the image data 0801 transformed in the frequency domain. This processing is similar to Laplacian filtering. Data 0803 is obtained by performing a quadratic differential on the transformed image data 0801 in the frequency domain. An appropriate threshold 0804 is selected for the data 0803, and threshold processing is performed, thereby extracting impulse signals.

Figure 26:
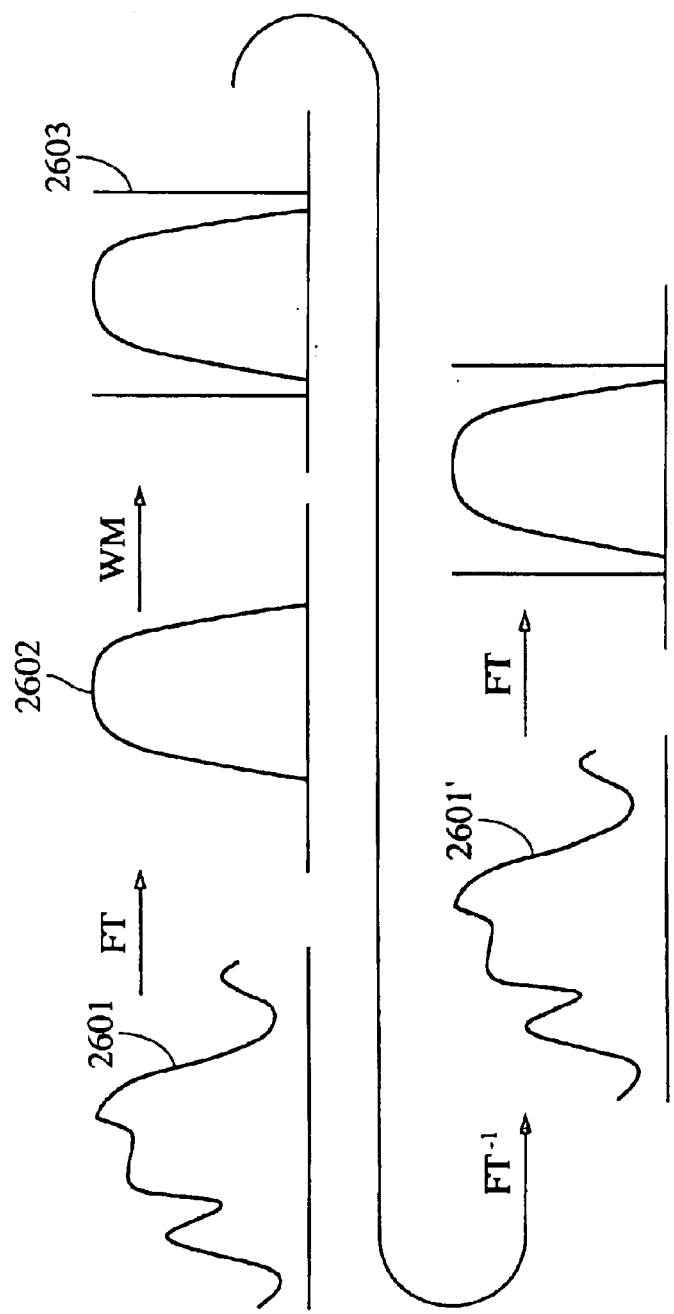
FIG. 26 is an illustration for describing the principle of embedding and extracting the registration signal.

Referring to FIG. 26, the principle of the above method for extracting the impulse signals is described in detail. FIG. 26 also shows processing performed at the registration signal embedding side.

In the registration signal embedding unit 0102, image data 2601 in the spatial domain is transformed to image data 2602 in the frequency domain. An impulse signal 2603 is appended to the image data 2602 in the frequency domain.

Inverse frequency transformation is performed on the image data in the frequency domain to which the impulse signal (registration signal) 2603 is appended, and image data 2601' in the spatial domain is restored. Even though some effects of the impulse signal 2603 can be found on the restored image data 2601' in the spatial domain, they are substantially imperceptible to the human eye. Practically, the image data 2601 and the image data 2601' seem to be identical. This is because the impulse signal 2603 appended in the frequency domain by the inverse Fourier transform is distributed in the entire image data with a small magnitude.

Appending an impulse signal as the impulse signal 2603 shown in FIG. 26 is similar to appending image data with a certain frequency component in the spatial domain. When the appended impulse signal is larger than a frequency perceptible to a person, and when the magnitude of the embedded impulse signal is not greater than a limit perceptible to a person, the appended impulse signal is not perceptible to the human eye. Therefore, the above method for appending the impulse signal is one type of digital watermarking.

According to the present embodiment, the registration signal 2603 is embedded in the image data 2601, and then the additional information Inf to be actually embedded is embedded. Finally, the image data 2601' in the spatial domain is restored.

When extracting the registration signal which is embedded as shown in FIG. 26, the Fourier transform is again performed. Therefore, the registration signal 2603 dispersed in the entire image data in the spatial domain is transformed to the signal in the frequency domain and restored as the impulse signal.

When a digitally watermarked image is attacked by, for example, irreversible compression including JPEG compression, it is very likely that the impulse has a small magnitude. In contrast, when the image is geometrically attacked by scaling or the like, the impulse is displaced. In both cases, the impulse signal can be extracted by performing appropriate impulse extraction as described above, and a variation from the original image can be estimated. Compensation for the variation ensures that the embedded additional information Inf in the embodiment is reliably extracted.

Accordingly, the impulse signal is output from the impulse extracting unit 0703 shown in FIG. 7, and the impulse signal is input to the scaling factor computing unit 0704. The scaling factor computing unit 0704 computes scaling based on the coordinates of the input impulse signal.

It is assumed that, in the present embodiment, a frequency component in which the impulse signal is embedded is known in advance at the digital watermark extracting unit side. In this case, the scaling factor is computed based on the ratio of the frequency at which the impulse signal is embedded to the frequency at which the impulse is detected. For example, when the frequency of an embedded impulse signal is expressed by a and the frequency of a detected impulse signal is expressed by b, it can be concluded that scaling by the ratio a/b is performed. This is a well-known property of the Fourier transform. Accordingly, the scaling factor computing unit 0703 outputs the scaling factor.

The present invention is not limited to the above processing. As circumstances demand, the digital watermark embedding unit side may receive information about the position (frequency) at which the registration signal is embedded. For example, the positional information is received as an encoded signal, and the above computation processing for computing the scaling factor is performed. In this manner, only the person who knows the registration signal can reliably extract the additional information Inf. In this case, the registration signal is employed as the key to extracting the additional information Inf.

The scaling factor output from the scaling factor computing unit 0704 is input to the scaling unit 0705. The image data $wI_1'$ is input to the scaling unit 0705. Scaling of the input image data $wI_1'$ by the scaling factor is performed. Scaling can be performed by various methods, such as bilinear interpolation and bicubic interpolation. The image data $wI_2'$ is output from the scaling unit 0705.

The operation of the additional information extracting unit 0203 shown in FIG. 2, which extracts the additional information Inf from the blue component of the image data wI' in which the additional information Inf is embedded by the additional information embedding unit 0103, is described.

Figure 20:
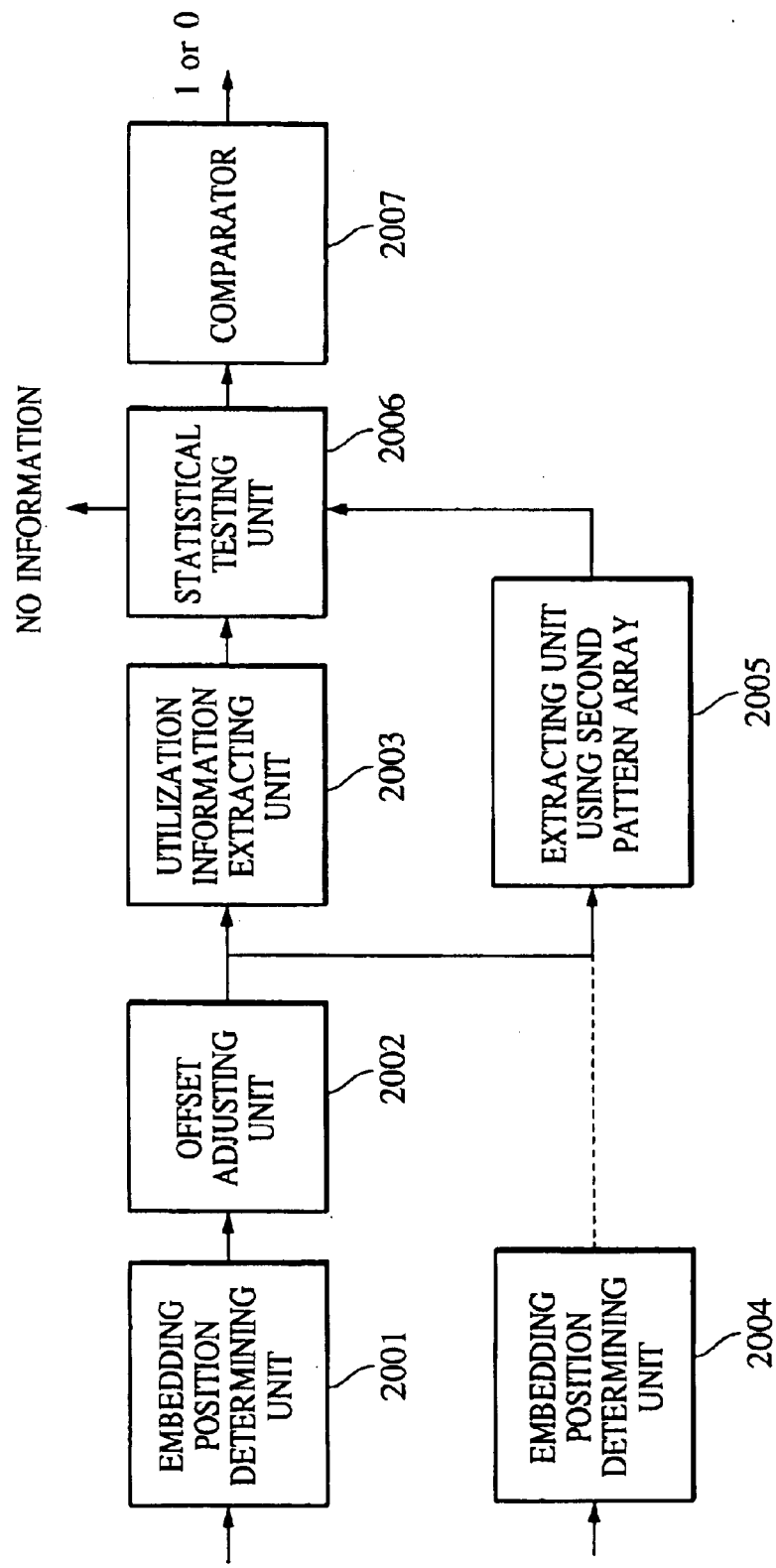
FIG. 20 is a block diagram of an additional information extracting unit.

FIG. 20 shows the additional information extracting unit 0203.

Referring to FIG. 20, an embedding position determining unit 2001 determines a region in the image data $wI_2'$ (blue component) from which the additional information Inf is extracted. The operation of the embedding position determining unit 2001 is the same as the operation of the embedding position determining unit 0103. Therefore, the same region is determined by the embedding position determining units 0103 and 2001.

From the determined region, the additional information Inf is extracted using Table 2 and the pattern array shown in FIG. 9.

Extraction of the additional information Inf is performed by convolution of the pattern array on the determined region.

The reliability distance d is a calculated value required for extracting the embedded information.

Figure 6:
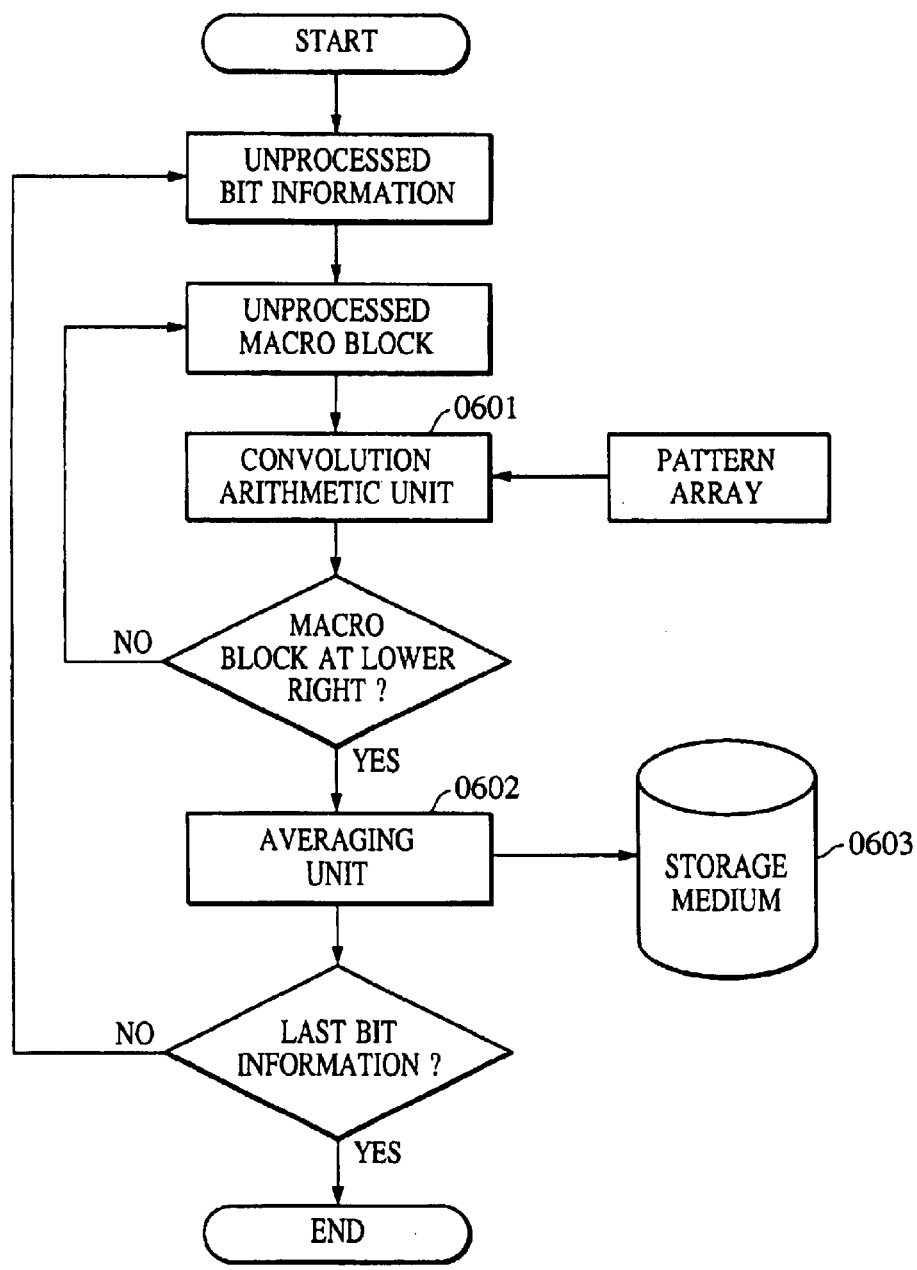
FIG. 6 is a flowchart showing a process of computing reliability distance.

FIG. 6 shows a process of obtaining the reliability distance d corresponding to each bit of information.

Processing performed by a convolution arithmetic unit 0601 is described with reference to FIGS. 21 and 22.

Figure 21:
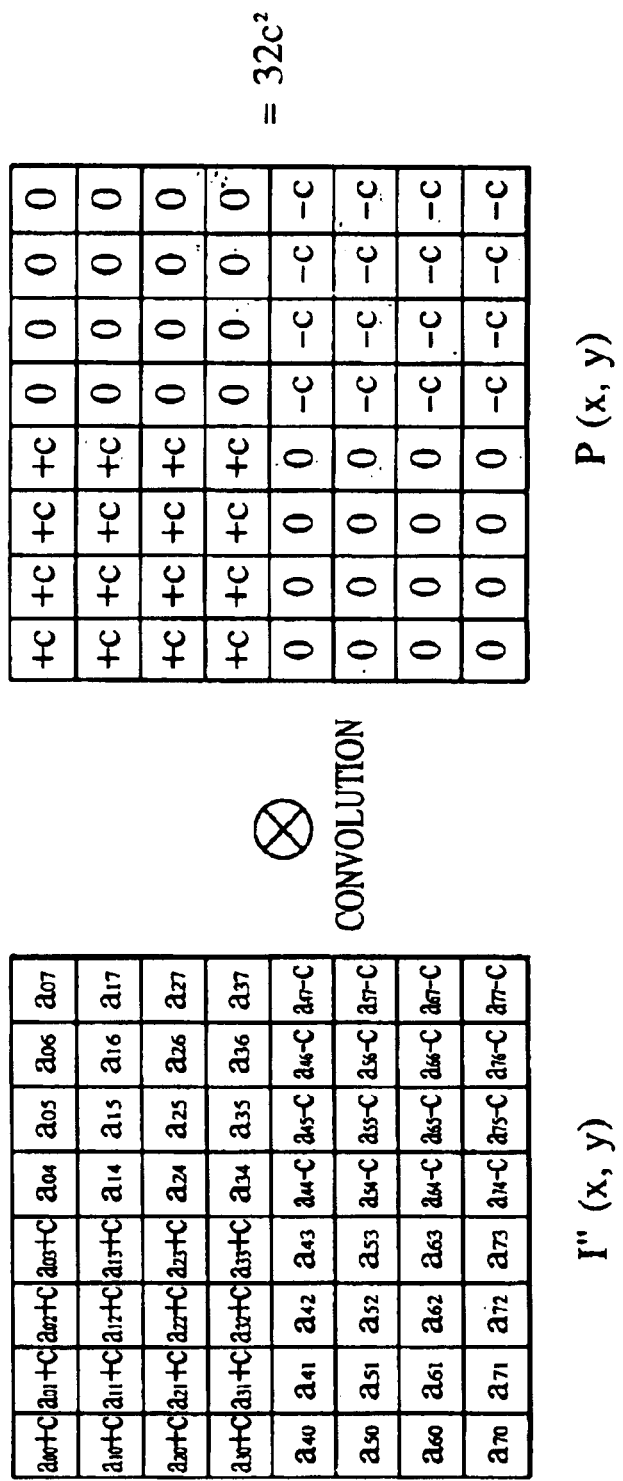
FIG. 21 is an illustration of extracting the additional information Inf.
Figure 22:
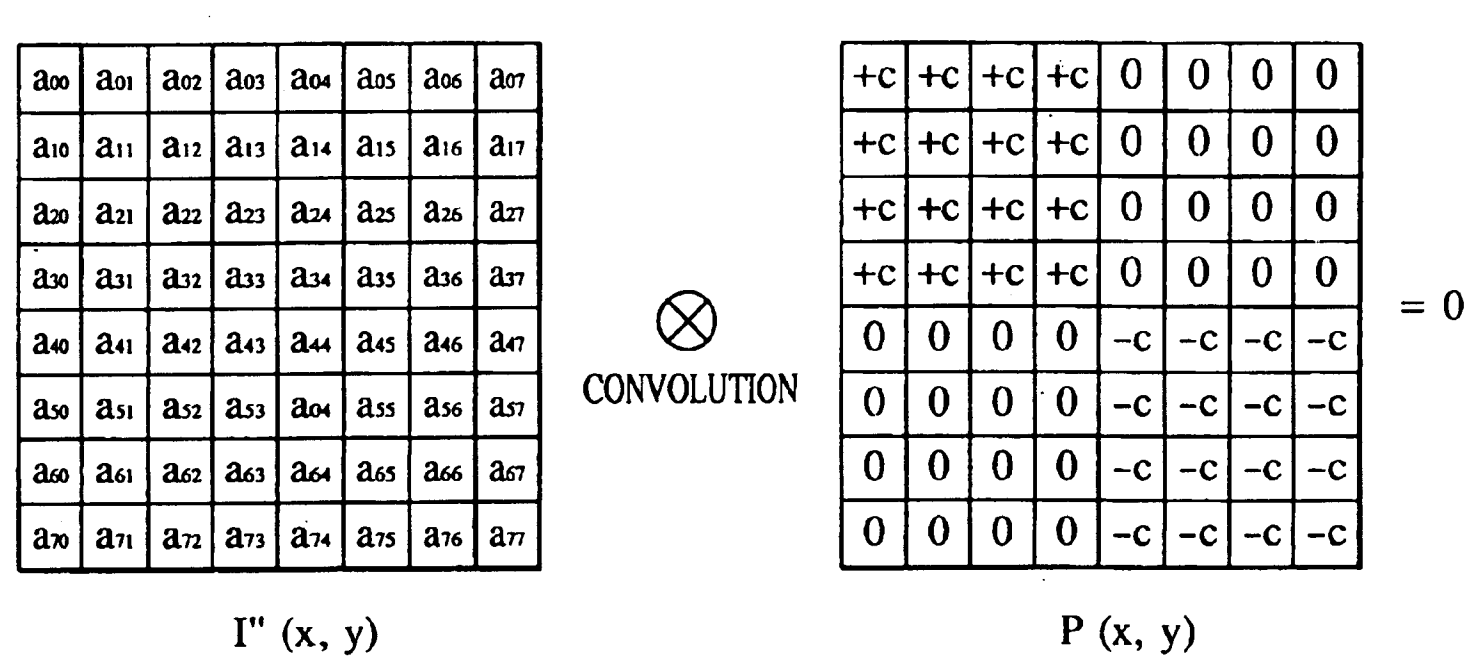

Referring to FIGS. 21 and 22, examples of extracting 1-bit information constructing the additional information Inf are illustrated.

FIG. 21 shows an example of extracting 1-bit information from image data (blue component) I"(x, y) in which the 1-bit information constructing the additional information Inf is embedded. FIG. 22 shows an example of extracting 1-bit information from image data I"(x, y) in which the 1-bit information is not embedded.

Referring to FIG. 21, the 1-bit information is embedded in the image data I"(x, y). An 8×8 pattern array P(x, y), i.e., a pattern array for extracting the additional information Inf, is used for convolution. Each element (0, +c, or −c) constructing the 8×8 pattern array is integrated with the corresponding pixel level of the input image data I"(x, y) which is located at the same position as that of the element (0, +c, or −c), and summation of integrated values is performed. In other words, the pattern array P(x, y) is convoluted with the image data I"(x, y). The image data I"(x, y) covers a case in which it is attacked. When the image data is not attacked, I"(x, y)=I'(x, y). When the 1-bit information is embedded in the image data I"(x, y), it is very likely that a non-zero value is obtained as a result of convolution, as shown in FIG. 21. When I"(x, y)=I'(x, y), $32C^2$ is obtained as the convolution result.

Although the same pattern is used for embedding and extracting the information in the present embodiment, the present invention is not limited to this. When P(x, y) is a pattern array used for embedding, and P'(x, y) is a pattern array used for extraction, the relationship between the two is expressed as:

$$P'(x, y) = aP(x, y) \qquad (6)$$

where a is an arbitrary number.

In the present embodiment, it is assumed that a=1 in order to simplify the description.

In contrast, the example shown in FIG. 22 illustrates the case in which the above processing is performed for the image data I"(x, y) in which the 1-bit information is not embedded. From an original image (corresponding to the image data I), a zero value is obtained as a result of convolution, as shown in FIG. 22.

The process for extracting the 1-bit information is illustrated hereinabove with reference to FIGS. 21 and 22. The foregoing description illustrates an ideal case in which the convolution result of the image data I in which the additional information Inf is to be embedded is zero. In practice, it is less likely that zero is obtained as a result of the convolution on a region of the image data I corresponding to the 8×8 pattern array.

Specifically, when the convolution arithmetic is performed on a region in the original image (image data I) corresponding to the 8×8 pattern array using the pattern array shown in FIG. 9 (the cone mask is also referred to for the placement information), a non-zero value may be computed contrary to the ideal case. In contrast, when the convolution arithmetic is similarly performed on a region corresponding to the 8×8 pattern array in the image (image data wI) in which the additional information Inf is embedded, a resultant value may be zero instead of $32c^2$.

Generally, each bit of information constructing the additional information Inf is embedded in the original image data a plurality of times. In other words, the additional information Inf is embedded in the image a plurality of times.

The convolution arithmetic unit 0601 performs summation of results of the convolution arithmetic performed on each bit of information forming the additional information Inf. For example, when the additional information Inf has eight bits, eight sums are obtained. The sums corresponding to the bits of information are input to an averaging unit 0602. The sums are divided by the number of all macro blocks n, thereby obtaining the average. The resultant average is the reliability distance d. In other words, the reliability distance d is a value generated by majority decision according to whether it is closest to $32c^2$ or zero shown in FIG. 21.

In the previous description of the patchwork method, the reliability distance d is defined as $d=(1/N)\Sigma(a_i-b_i)$. Strictly speaking, the reliability distance d is an average of results obtained by performing the convolution arithmetic using P'(x, y)=(1/c)P(x, y). When performing the convolution arithmetic using P'(x, y)=aP(x, y), an average of the convolution results is a real-number multiplied by the reliability distance d. The convolution using P'(x, y)=(1/c)P(x, y) is substantially as efficient as the convolution using P'(x, y)=aP(x, y). Hence, the present invention is applicable to using an average of the results obtained by the convolution using P'(x, y)=aP(x, y) as the reliability distance d.

The obtained reliability distance d is stored in a storage medium 0603.

The convolution arithmetic unit 0601 repetitively obtains the reliability distance d for each bit forming the additional information Inf, and sequentially stores the reliability distance d in the storage medium 0603.

The computed value is described in detail. Ideally, the reliability distance d computed for the original image data I using the pattern array shown in FIG. 9 (the cone mask is also referred to for the placement information) is zero. For the actual data I, however, the computed value is often a non-zero value though it is extremely close to zero. A histogram of the reliability distance d for each bit of information is as shown in FIG. 23.

Figure 23:
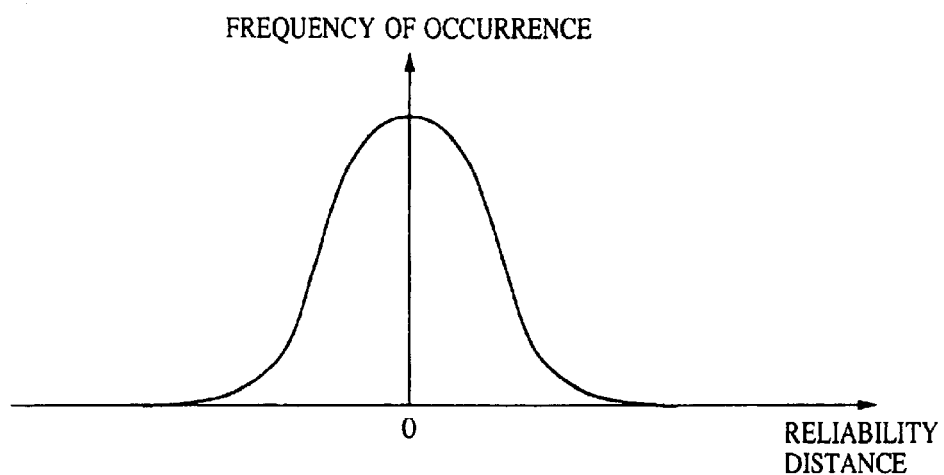
FIG. 23 is an ideal histogram when the reliability distances d are extracted from the original image.

Referring to FIG. 23, the horizontal axis indicates the reliability distance d generated for each bit of information, and the vertical axis indicates the number of bits of information, that is, the frequency of occurrence of the reliability distance d, for which the convolution is performed to obtain the reliability distance d. In the original image data I, the reliability distance is not necessarily zero, whereas an average thereof is zero or a value close to zero.

Figure 24:
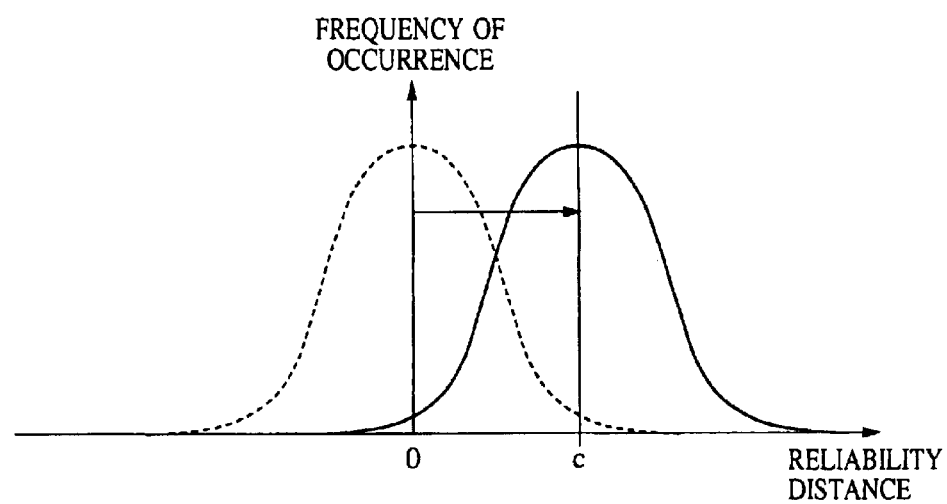
FIG. 24 is an example of a histogram of the reliability distances d.

In contrast, when the convolution of the image data (blue component) in which the bit information indicating one is embedded, as shown in FIG. 19, is performed on I'(x, y), a histogram of the reliability distance d is as shown in FIG. 24. Specifically, the histogram in FIG. 24 is shifted rightward while retaining the shape of the histogram shown in FIG. 23. In this manner, the reliability distance d of the image data in which the 1-bit information constructing the additional information Inf is embedded may not always be c, but an average thereof is c or a value close to c.

FIG. 24 illustrates the example in which the bit information indicating one is embedded. When bit information indicating zero is embedded, the histogram shown in FIG. 23 is shifted to the left.

As described above, when embedding the additional information Inf (each bit of information) using the patchwork method, the larger the number of bits to be embedded (the usage count of the pattern array), the more accurate the statistical distribution shown in FIGS. 23 and 24 becomes. This improves the accuracy in determining whether each bit of information forming the additional information Inf is embedded or detecting whether the embedded bit information is one or zero.

The structure of the offset adjusting unit 2002 is described.

The appropriately scaled image data is input to the offset adjusting unit 2002. Subsequently, the start bits are detected by the reliability distance computation shown in FIG. 6. The offset adjusting unit 2002 generates five reliability distances corresponding to five bits of the start bits $Inf_1$. The start bits $Inf_1$ are part of the additional information Inf embedded by the additional information embedding unit 0104, as shown in FIG. 36. In the embodiment, there are five start bits $Inf_1$.

Conceptually, the start bits $Inf_1$ are the first five bits of the additional information Inf. In fact, the start bits $Inf_1$ are not adjacently or densely provided in the image in which the additional information Inf is embedded. The start bits $Inf_1$ are dispersed since they are sequentially embedded correspondingly to the coefficients forming the cone mask as shown in Table 2.

Figure 28:
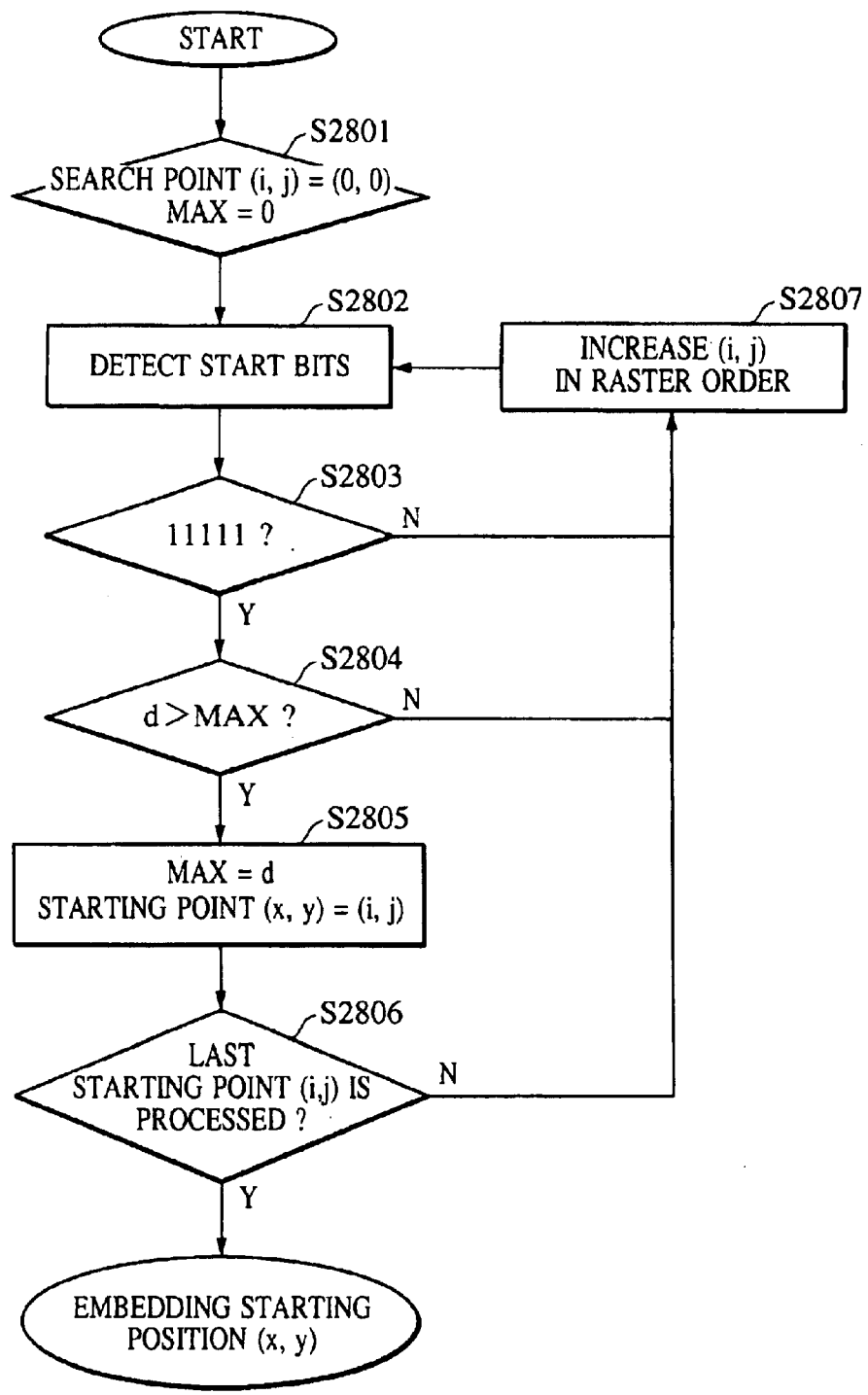
FIG. 28 is a flowchart showing a process of performing offset adjustment.

FIG. 28 shows a flowchart illustrating a process performed by the offset adjusting unit 2002. The following description is provided by referring to the flowchart shown in FIG. 28.

In step S2801, the offset adjusting unit 2002 regards, for the input image data $wI_2'$, the upper left coordinates as embedding starting coordinates. At the same time, the maximum MAX is set to zero. In step S2802, the start bits are detected by the reliability distance computation shown in FIG. 6.

In step S2803, the process determines whether the first to fifth bits of information obtained are correct start bits "11111". If the determination is affirmative, a series of five positive reliability distances d are detected as a result. If the determination is negative, it is less likely that a series of five positive reliability distances d is obtained. The process sequentially performs the above determination, thereby determining the position at which the correct start bits $Inf_1$ are detected as the embedding starting coordinates.

As a matter of fact, the correct start bits $Inf_1$ may be detected at a point other than the point expressed by the embedding starting coordinates. The cause for this is described with reference to FIGS. 27A to 27C.

Figure 27C:
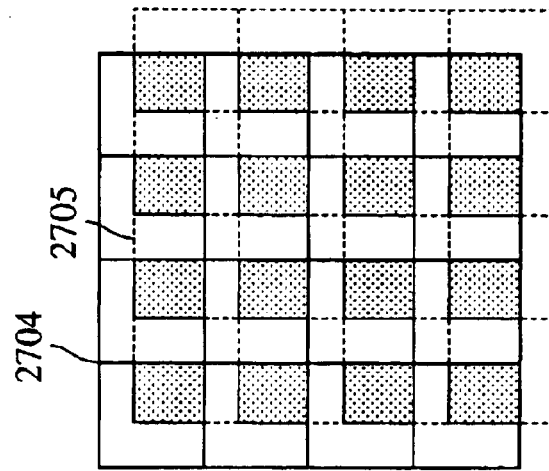
FIGS. 27A to 27C are illustrations of performing offset adjustment.
Figure 27B:
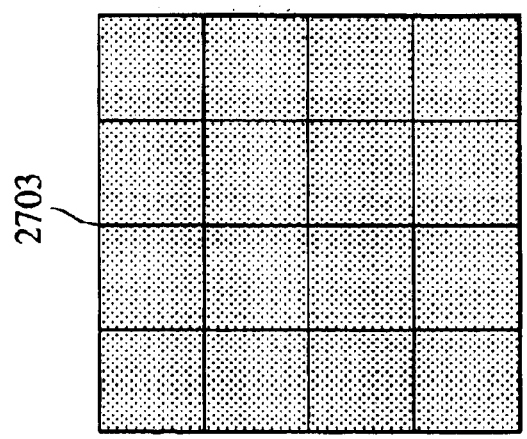
Figure 27A:
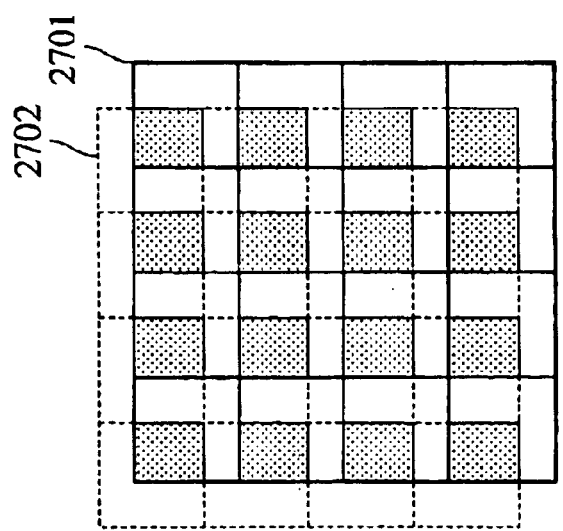

Referring to FIGS. 27A to 27C, in order to extract the additional information Inf embedded by the patchwork method used in the present embodiment, the original positions of macro blocks 2701, 2703, and 2704 are searched for by convolution using pattern arrays 2702 and 2704 which are the same as the pattern array used in embedding the additional information Inf (the cone mask is also referred to for the placement information). Searching sequentially advances from FIG. 27A to FIG. 27C.

In FIGS. 27A to 27C, searching is performed based on one macro block (the minimum unit for extracting the additional information Inf) which is part of the image data $wI_2'$. One small box conceptually represents the size of a pattern array used to embed one bit of information.

Referring to FIG. 27A, when the relationship between the macro block 2701 and the pattern array 2702 is such that the pattern array 2702 is at a position above and to the left of the macro block 2701, the original image and the pattern array for extracting the additional information Inf overlap only in the shaded regions.

Referring to FIG. 27B, searching further advances, and the position being searched for completely coincides with the actual position of the macro block. In this state, the pattern array to be convoluted and the macro block overlap each other to the fullest extent.

Referring to FIG. 27C, the position being searched for is below and to the right of the position of the macro block in which the additional information Inf is actually embedded. In this state, the pattern array to be convoluted and the macro block overlap each other in the shaded regions.

Referring to FIGS. 27A to 27C, when the pattern array to be convoluted and the macro block sufficiently overlap each other, the correct start bits $Inf_1$ can be extracted. The reliability distances d of the three cases shown in FIGS. 27A to 27C are different because the overlapping areas are different in each case.

Each overlapping area may replace the reliability distance d. Specifically, when the positions of the pattern array to be convoluted and the macro block completely coincide with each other, each bit of information and the reliability distance d are very close to $\pm 32c^2$, as described above.

Referring back to FIG. 28, when the process determines, in step S2803, that the obtained bits of information are not the correct start bits $Inf_1$, the process moves to the next searching point in the raster order in step S2807. In contrast, when the process determines that the bits of information are the correct start bits $Inf_1$, the process determines, in step S2804, whether the sum of the reliability distances corresponding to the five start bits $Inf_1$ is smaller the maximum MAX. If the determination is negative, the process moves, in step S2807, to the next starting point in the raster order. When the sum of the reliability distances corresponding to the five start bits $Inf_1$ is larger than the maximum MAX, the maximum MAX is updated to the sum of the reliability distances d. Simultaneously, the current searching point is stored as the embedding starting position. In step S2806, the process determines whether searching for all the searching points is performed. If the determination is negative, the process moves, in step S2807, to the next searching point in the raster order. If all the searching points are searched for, the currently stored embedding starting position is output, and the process is terminated.

Accordingly, the offset adjusting unit 2002 of the present embodiment detects the start bits $Inf_1$. Among the coordinates at which the correct start bits $Inf_1$ are obtained, the coordinates at which the largest sum of the reliability distances is obtained is determined as the coordinates of the embedding starting position of the additional information Inf. The information on the determined coordinates is output as the embedding starting coordinates to the subsequent stage.

The embedding starting coordinates and the image data in which the additional information Inf is embedded are input from the offset adjusting unit 2002 to a utilization information extracting unit 2003. Using the computation described in FIG. 6, the reliability distance d1 for each bit of information constructing the utilization information $Inf_2$ is computed. The reliability distance d1 for each bit of information is output to a statistical testing unit 2006.

Obtaining the reliability distance d1 corresponding to each bit of information forming the utilization information $Inf_2$ is substantially equivalent to obtaining each bit forming the embedded utilization information $Inf_2$. This is described in detail hereinafter.

Here only the reliability distances d1 are obtained based on the embedding starting coordinates determined by the above searching process. The five start bits $Inf_1$ are not extracted.

The statistical testing unit 2006 determines the reliability of the reliability distances d1 obtained by the utilization information extracting unit 2003 in FIG. 20. The determination is performed by generating reliability distances d2 using a second pattern array differing from the first pattern array used for extracting the additional information Inf or the utilization information $Inf_2$. A reference to a histogram of the reliability distances d2 is made, and a reliability index D is generated.

The reliability distances d1 are obtained using the first pattern array (the cone mask is also referred to for the placement information) for extracting the utilization information $Inf_2$ by the utilization information extracting unit 2003. The reliability distances d2 are obtained using the second pattern array differing from the first pattern array. Normally, the first pattern array is the pattern array shown in FIG. 9 employed to embed the additional information Inf including the start bits $Inf_1$ and the utilization information $Inf_2$.

The second pattern array and the reliability index D are described in detail in the following description.

The subsets A and B are sets of N-number of elements, expressed as $A=\{a_1, a_2, \ldots, a_N\}$ and $B=\{b_1, b_2, \ldots, b_N\}$, as shown in FIG. 30. Each element of the subsets A and B is a pixel level.

Regarding the reliability distances d expressed by $\Sigma(a_i-b_i)/N$, when N has a substantially large value and pixel levels $a_i$ and $b_i$ are not correlated, the expectation value of the reliability distances d is zero. By the central limit theorem, the distribution of the reliability distances d is a normal distribution.

The central limit theorem is briefly described.

The central limit theorem indicates that, when extracting arbitrary samples of size $n_c$ from a population, not necessarily in a normal distribution, with a mean $m_c$ and a standard deviation $\sigma_c$, the distribution of sample means $S_c$ approaches a normal distribution $N(m_c, (\sigma_c/\sqrt{n_c})^2)$ as $n_c$ increases.

In general, the standard deviation $\sigma_c$ of the population is unknown. When the number of samples $n_c$ is sufficiently large and when the population $N_c$ is larger than the number of samples $n_c$, no practical difficulty is caused by replacing $\sigma_c$ with a standard deviation $s_c$ of the samples.

Turning back to the description of the present embodiment, the histogram of the reliability distances d1 obtained by the utilization information extracting unit 2003 greatly varies depending on whether the utilization information $Inf_2$ is accurately extracted.

For example, when the start bits $Inf_1$ are not correctly detected, such as when offset adjustment is not accurately performed, the bit information is not embedded at a position at which the utilization information $Inf_2$ should have been embedded. Hence, the histogram of the reliability distances d1 becomes a normal histogram 2501 shown in FIG. 25.

In contrast, when the utilization information $Inf_2$ is accurately extracted, each reliability distance d1 corresponding to each bit of information indicating one, which forms part of the utilization information $Inf_2$, is accumulated at a position of a normal distribution 2502. Each reliability distance d1 corresponding to each bit of information indicating zero, which forms part of the utilization information $Inf_2$, is accumulated at a position of a normal distribution 2503. Hence, two "peaks" are formed. The ratio of the sizes of the two "peaks" is substantially similar to the ratio of the number of bits of information indicating one to the number of bits of information indicating zero.

The above description assumes that the reliability distances d1 obtained by convoluting the first pattern array with the original image data in which the additional information Inf is not embedded has the normal distribution 2501.

In reality, it is impossible to determine whether the utilization information $Inf_2$ is accurately extracted unless the state of the original image is known.

According to the present embodiment, the so-called second pattern array, capable of reliably determining the state of the original image even though the additional information Inf is embedded, is used to generate a normal distribution of the reliability distances d2. This normal distribution is regarded as the normal distribution 2501, and it is determined whether the utilization information $Inf_2$ is correctly extracted.

For example, when the histogram of the reliability distances d1 is detected outside a shaded portion (elements from the center to 95%) forming the normal distribution 2501 created based on the reliability distances d2, it can be concluded that there is a statistical bias in a target image and that the utilization information $Inf_2$ is embedded in the image. Hence, the reliability of the utilization information $Inf_2$ is statistically determined. The method for performing the above statistical determination is described in detail in the following description.

The following description illustrates a method for generating a distribution similar to the histogram of the reliability distances d1 before the additional information Inf is embedded, such as the normal distribution 2501, using the image data in which the additional information Inf or the utilization information $Inf_2$ is embedded.

According to the present embodiment, an extraction unit 2005 uses the second pattern array to obtain the reliability distances d2 generating a distribution similar to the normal distribution 2501.

The extraction unit 2005 obtains the reliability distances d2 using the second pattern array which is "orthogonal" to the first pattern array used by the utilization information extracting unit 2003. The extraction unit 2005 operates in a manner substantially similar to the utilization information extracting unit 2003 in performing convolution or the like.

In order to contrast one case with another, the pattern array shown in FIG. 9 used by the utilization information extracting unit 2003 is referred to as a "first pattern array", and the mask or the cone mask used for referring to the position at which the first pattern array is placed is referred to as a "first position reference mask". The pattern array "orthogonal" to the first pattern array is referred to as a "second pattern array", and a mask used for referring to the position at which the second pattern array is placed is referred to as a "second position reference mask".

The offset adjusting unit 2002 inputs the embedding starting coordinates to the extraction unit 2005 using the second pattern array. The reliability distances d2 are computed based on the reliability distance computation illustrated in FIG. 6.

The pattern array used in the reliability distance computation shown in FIG. 6 is not the pattern array shown in FIG. 9 used for embedding information. Instead, a pattern array 3301 shown in FIG. 33A or a pattern array 3302 shown in FIG. 33B, each of which is "orthogonal" to the pattern array 0901, is used.

This is because the reliability distances d2 computed using the pattern array 3301 or the pattern array 3302 are not influenced by processing performed based on the pattern array 0901 shown in FIG. 9 which is used to embed the additional information Inf.

Figure 34:
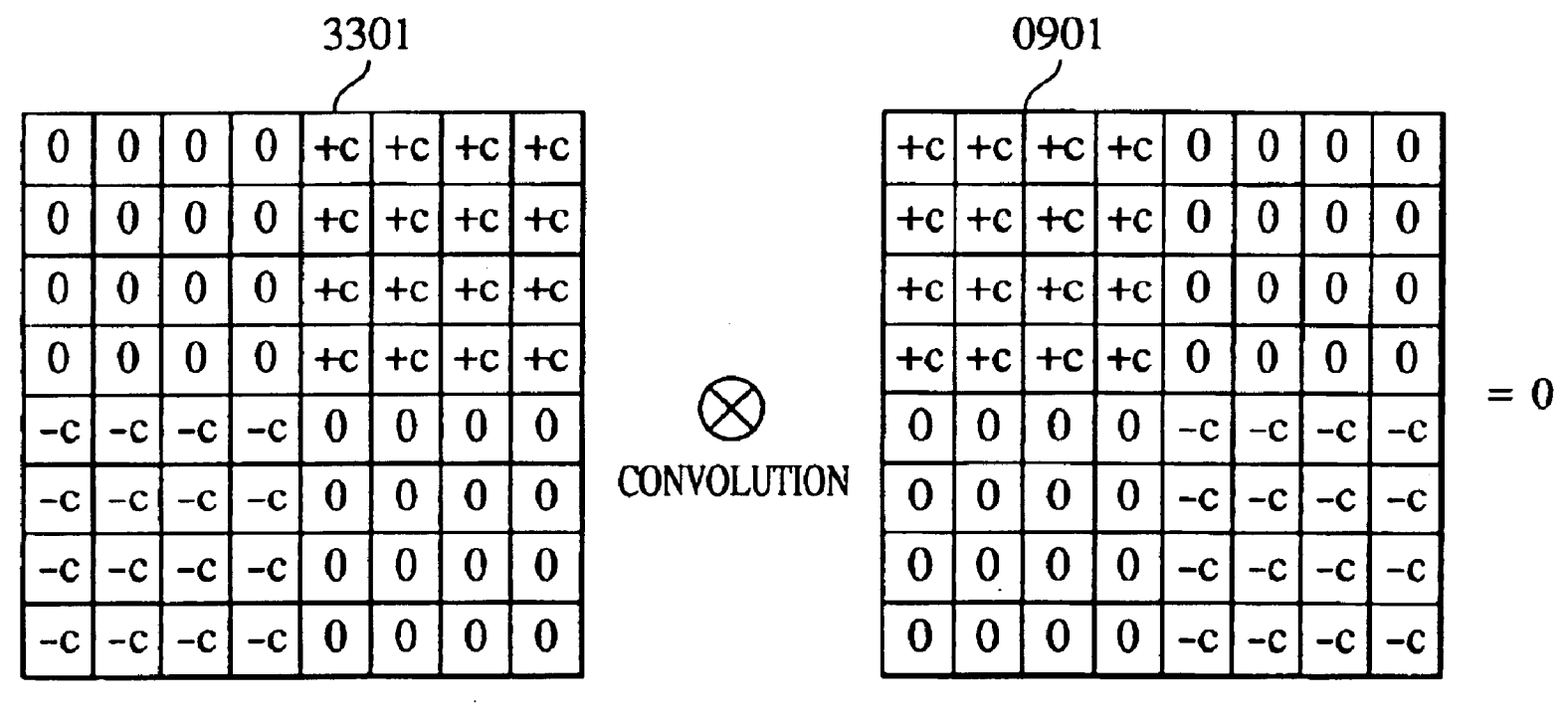

Referring to FIG. 34, when the pattern array 0901 shown in FIG. 9 is convoluted with the pattern array 3301 which is "orthogonal" to the pattern array 0901, zero is given as a result. The same result is obtained when convolution is performed on the pattern array 3302. Specifically, the results of convoluting the first and second pattern arrays are zeros. Therefore, when the gray level of the original image is changed using the first pattern array, this has no influence on the reliability distances d obtained by convolution using the second pattern array.

Figure 25:
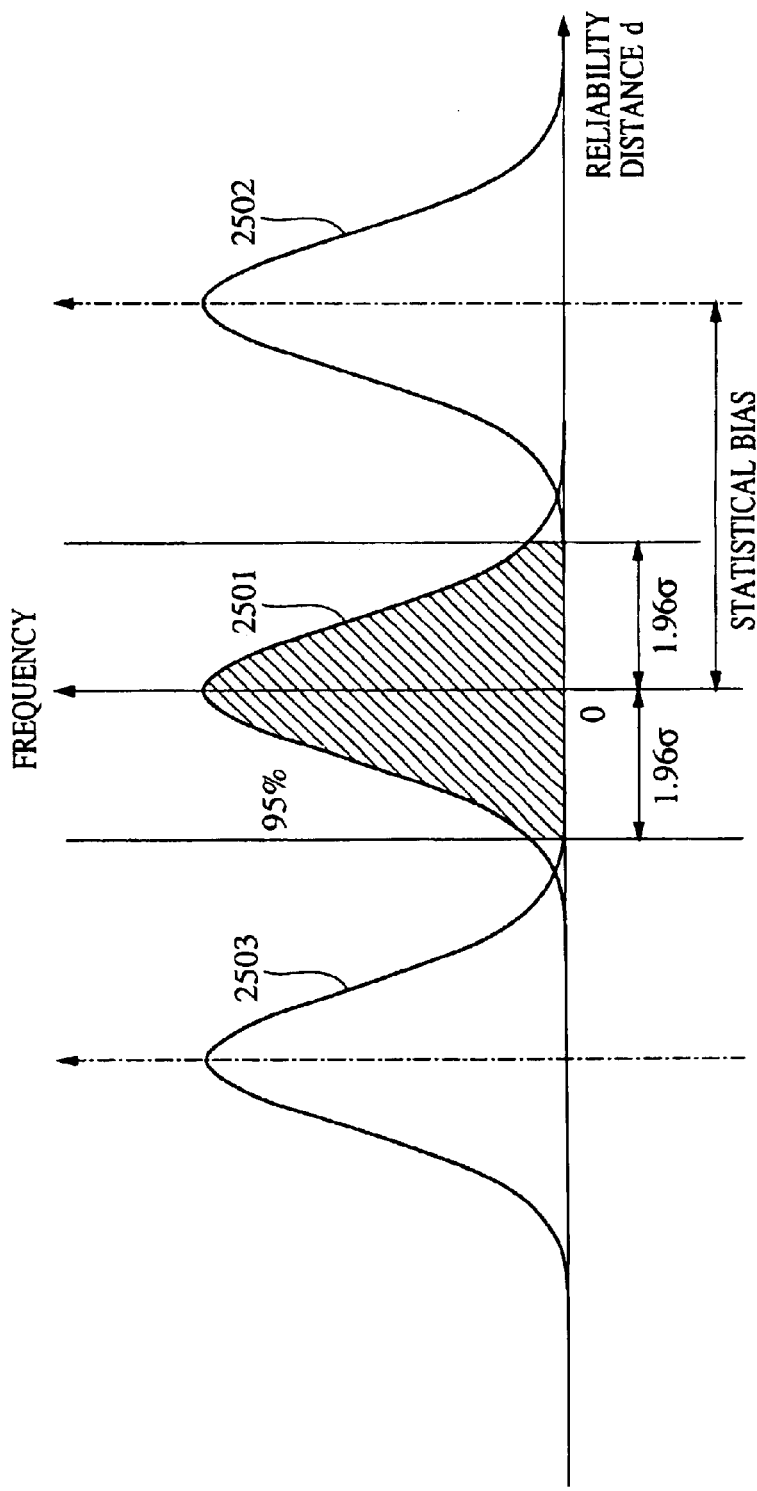
FIG. 25 illustrates histograms showing reliability distances d1 and d2.

The histogram of the reliability distances d2 obtained by convolution of the second pattern array on the image in which the additional information Inf is embedded is substantially the same as the normal distribution 2501 shown in FIG. 25. Therefore, the histogram is regarded as the normal distribution 2501.

The obtained normal distribution 2501 is used as the determination reference required for statistical testing performed in step S3207 in FIG. 32.

As described above, the extraction unit 2005 uses one of the pattern arrays 3301 and 3302 shown in FIGS. 33A and 33B, which are "orthogonal" to the first pattern array, and a second position reference mask 3502 shown in FIG. 35 to generate the normal distribution of the reliability distances d2.

Conditions for the pattern array "orthogonal" to the first pattern array include the following: (1) As shown in FIGS. 33A and 33B, the pattern array must have the same size as the pattern array 0901 shown in FIG. 9, and (2) when the pattern array 0901 shown in FIG. 9 used to embed the additional information Inf is convoluted with the pattern array, the result gives zero, as in the pattern array 3301 or 3302.

The convolution shown in FIG. 34 is the same as that shown in FIG. 21 and FIG. 22.

According to the present embodiment, when zero is obtained as the result of convolution, it is said that the pattern arrays are "orthogonal" to each other, similarly to the fact that the inner product of vectors is zero when the vectors are orthogonal to each other. Hence, each of the pattern arrays 3301 and 3302 shown in FIG. 33 is "orthogonal" to the pattern array 0901 shown in FIG. 9.

The pattern array "orthogonal" to the pattern array used to embed the additional information Inf is employed to compute the reliability distances d2 because a statistical bias is not generated in the distribution of the reliability distances d2. In other words, the histogram which has zero at the center is generated.

Moreover, another condition for the pattern array "orthogonal" to the first pattern array is as follows: (3) The pattern array "orthogonal" to the first array has the same number of non-zero elements as that of the pattern array used by the utilization information extracting unit 2003, and the number of positive elements and the number of negative elements are the same. Therefore, the reliability distances d1 and the reliability distances d2 are extracted under the same arithmetic processing conditions.

According to the present embodiment, the reference mask 3502 shown in FIG. 35 is used as the "second position reference mask". The pattern and the size of the reference mask 3502 differ from those of a first embedding position reference mask 3501.

When the first and second pattern arrays are different, the histogram of the reliability distances d2 is substantially similar to the normal distribution 2501.

When the positions of the start bits are not accurately detected, it is likely that a statistical bias is generated even when convolution using the second pattern array is performed. Taking this possibility into consideration, the sizes of the first and second position reference masks are made different, thereby canceling periodical elements. Alternatively, the pattern arrays in the masks may be arranged in different configurations. Hence, convolution is not performed in the same region.

In this case, the "second position reference mask" may be any type of mask as long as coefficients constructing the mask are randomly distributed. The "second position reference mask" need not be the cone mask.

When setting the "second embedding position reference mask" to be different from the "first embedding position reference mask", the "second embedding position reference mask" is created by the embedding position determining unit 2004 shown in FIG. 20.

In general, taking into consideration the resistance against cutting, it is less likely that the size of the first position reference mask, i.e., the cone mask, may not be that large compared with the entire image data in which the additional information Inf is to be embedded. Therefore, it is preferable that the size of the "second position reference mask" be large. According to the embodiment, the size of the second mask used to compute the reliability distances d1 at the additional information Inf side is set to be larger than the first mask which is referred to when embedding the additional information Inf.

The present invention is not limited to the above. Alternatively, the sizes of the first and second masks may be set to be equal, thereby partially achieving the effect. Hence, the "second position reference mask" may be created by the embedding position determining unit 2001 shown in FIG. 20.

The minimum condition for each mask is that the number of repetitions of each bit forming the additional information Inf to be applied to each mask is equal to that in an image region of the same size.

When extraction using the second pattern array fails to obtain a satisfactory result, another second pattern array or another second position reference mask satisfying the above condition may be used to again compute the reliability distances d2. As a result, an ideal histogram, i.e., the normal distribution 2501 shown in FIG. 25, may be created.

The specific operation of the extraction unit 2005 using the second pattern array is described.

According to the present embodiment, a 32×32 cone mask is used as the first position reference mask, and a 64×64 cone mask is used as the second position reference mask. In the two masks, the relative arrays of coefficients are completely different.

Using the second pattern array, the extraction unit 2005 determines the embedding position in accordance with Table 3:

TABLE 3

| Order of bits of information | 1 | 2 | 3 | 4 | ... | 69 |
|---|---|---|---|---|---|---|
| Coefficients in second position reference mask | 0, 1 | 2, 3 | 4, 5 | 6, 7 | ... | 136, 137 |

In the second position reference mask, the same coefficient appears 16 times. In contrast, in the first position reference mask, i.e., the 32×32 cone mask, the same coefficient appears four times when the mask is referred to in accordance with Table 2. In other words, in the image data of the same size, the same coefficient appears the same number of times in the first position reference mask and in the second position reference mask.

According to the present embodiment, the second pattern array is allocated in accordance with the positional relationship illustrated in Table 3, and convolution is sequentially performed. As a result, 69 reliability distances d2 corresponding to 69 bits of information are computed.

The reliability distances d2 created by the extraction unit 2005 using the second pattern array are distributed in a manner substantially similar to the normal distribution 2501. Generally in a normal distribution, 95% of samples (reliability distances d2) appear in a range defined by the following expression:

$$m-1.96\sigma < d2 < m+1.96\sigma \quad (7)$$

where $\sigma$ is the standard deviation of the reliability distances d2 and m is the mean.

The above range is referred to as a "95% reliability region".

After computing the reliability distances d2 by the extraction unit 2005 using the second pattern array, $m-1.96\sigma$ and $m+1.96\sigma$ are calculated using the reliability distances d2.

When the bit information indicates one, the histogram of the reliability distances d1 input from the utilization information extracting unit 2003 to the statistical testing unit 2006 becomes the normal distribution 2502 shown in FIG. 25. When the bit information indicates zero, the histogram becomes the normal distribution 2503. Therefore, it is very likely that the reliability distances d1 corresponding to the utilization information $Inf_2$ are detected outside the 95% reliability region obtained by the extraction unit 2005 using the second pattern array, which is represented by the shaded portion in FIG. 25.

At the time the offset adjusting unit 2002 performs processing, when the utilization information $Inf_2$ is not detected in the target image, the histogram of the reliability distances d1 becomes the normal distribution 2501.

In this case, the probability of having the reliability region expressed by expression (7) in which all 64 reliability distances d1 corresponding to the utilization information $Inf_2$ are not included is $(1-0.95)^{64}$, which is very small.

Therefore, when the normal distribution 2501 is obtained based on the reliability distances d2, it is possible to reliably determine whether the additional information Inf or the utilization information $Inf_2$ is embedded by determining whether the histogram obtained based on the reliability distances d1 is included in a major portion of the normal distribution 2501.

The statistical testing unit 2006 utilizes the above characteristics to determine the reliability that the additional information Inf or the utilization information $Inf_2$ is embedded.

According to the present embodiment, the reliability that the additional information $Inf_2$ is embedded is referred to as the reliability index D.

The reliability index D is defined as the ratio of the number of reliability distances d1 outside the region defined by expression (7) to the number of all of the reliability distances d1 created by the utilization information extracting unit 2003.

When the reliability index D exceeds a threshold a, the statistical testing unit 2006 determines that the overall histogram of the reliability distances d1 is biased by someone's actions toward the normal distribution 2502 or the normal distribution 2503. It is thus determined that the utilization information $Inf_2$ is positively embedded in the image.

The reliability distances d1 used for determination are regarded as reliable information. Hence, the reliability distances d1 are permitted to be forwarded to a comparator 2007 at the subsequent stage.

As illustrated in step S3210 in FIG. 32, the reliability index D based on the utilization information $Inf_2$ or a message based on the reliability index D may be displayed on a monitor or the like.

For example, when the reliability index D is smaller than the threshold a, a message indicating that "the utilization information $Inf_2$ is not accurately extracted" is displayed. The process illustrated in FIG. 32 returns from step S3207 in which the statistical testing is performed to step S3202 in which an image is again input.

Values of the reliability distances d1 output through the utilization information extracting unit 2003 and the statistical testing unit 2006 are input to the comparator 2007 shown in FIG. 20. Since the input reliability distances d1 are highly reliable information, it is only necessary to determine whether each bit of information corresponding to the reliability distances d1 indicates one or zero.

Specifically, when the reliability distance d1 of each bit of information constructing the utilization information $Inf_2$ is a positive value, the bit of information is determined to be one. When the reliability distance d1 is a negative value, the bit of information is determined to be zero.

The utilization information $Inf_2$ obtained as above is output as reference information for a user or as final data for converting it into a control signal.

A series of processes from embedding the additional information Inf to extracting the additional information Inf is described hereinabove.

Alternatively, the additional information Inf or the utilization information $Inf_2$ used in the above embodiment may be replaced by error-correction-coded information. In this case, the reliability of the extracted utilization information $Inf_2$ is further enhanced.

The present invention is applicable to part of a system including a plurality of devices, such as a host computer, an interface device, a reader, and a printer. Also the present invention is applicable to part of a device such as a copying machine or a facsimile machine.

The present invention is not limited to a device or a method for accomplishing the above embodiment. The present invention also covers a case in which software program code for accomplishing the above embodiment is provided, and a computer of the system or the device operates the various devices in accordance with the program code, thereby accomplishing the above embodiment.

In this case, the software program code itself performs the functions of the above embodiment. Therefore, the present invention covers the program code and a medium for providing the computer with the program code, that is, a storage medium for storing the program code.

For example, the storage medium for storing the program code includes a floppy disk, a hard disk, an optical disk, a magneto-optical disk, a magnetic tape, a nonvolatile memory card, or a ROM.

The present invention covers not only the above case in which the computer controls the various devices in accordance with the supplied program code and accomplishes the functions of the embodiment, but also a case in which the program code accomplishes the above embodiment in cooperation with an operating system (OS) running in the computer or other application software.

The present invention also covers a case in which, after the program code is stored in a memory of an add-on board of the computer or an add-on unit connected to the computer, a CPU of the add-on board or the add-on unit performs part or the entirety of the actual processing based on instructions from the program code, thereby performing the functions of the above embodiment.

Although the cone mask is used to embed the digital watermark information in the above embodiment, the present invention is not limited to that embodiment. The present invention also covers a case in which the blue noise mask is used to embed the digital watermark information.

The present invention includes any structure as long as that structure includes at least one of the above characteristic points.

Except as otherwise disclosed herein, the various components shown in outline or in block form in the Figures are individually well known and their internal construction and operation are not critical either to the making or using of this invention or to a description of the best mode of the invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing device for embedding digital watermark information in a gray-scale image or a color image, comprising:

input means for inputting image data;

judging means for judging whether the inputted image data is gray-scale image data in which each pixel is formed of one component or color image data in which each pixel is formed of a plurality of components;

converting means for converting the format of the gray-scale image data into color image data in which each pixel is formed of a plurality of components; and embedding means for embedding the digital watermark information in part of the components of the color image data obtained by said input means or said converting means.

2. An image processing device according to claim 1, wherein each pixel in the color image data includes red, green, and blue components.

3. An image processing device according to claim 2, wherein said embedding means embeds the digital watermark information in the blue component.

4. An image processing device according to claim 1, wherein each pixel in the color image data includes brightness and chrominance components.

5. An image processing device according to claim 4, further comprising encoding means for compressing and encoding the color image data including the brightness and the chrominance components.

6. An image processing device according to claim 4, wherein said embedding means embeds the digital watermark information in the chrominance component.

7. An image processing device according to claim 1, wherein each pixel in the color image data includes at least yellow, magenta, and cyan components.

8. An image processing device according to claim 1, further comprising additional converting means for converting the color image data into other color image data in which each pixel includes brightness and chrominance components.

9. An image processing device according to claim 8, further comprising encoding means for compressing and encoding the color image data including the brightness and the chrominance components.

10. An image processing device according to claim 9, wherein said embedding means embeds the digital watermark information in a manner such that the information is not lost when said encoding means compresses and encodes the color image data.

11. An image processing device according to claim 1, wherein said embedding means embeds a part of the digital watermark information in a part of the color image data in such a manner that the overall gray level of the image is not changed.

12. An image processing method for embedding digital watermark information in a gray-scale image or a color image, comprising the steps of:

inputting image data;

judging whether the inputted image data is gray-scale image data in which each pixel is formed of one component or color image data in which each pixel is formed of a plurality of components;

converting the format of the gray-scale image data into color image data in which each pixel is formed of a plurality of components; and embedding the digital watermark information in part of the components of the color image data obtained in said inputting step or in said converting step.

13. An image processing method according to claim 12, wherein said converting step comprises converting the format of the gray-scale image data into color image data in which each pixel includes red, green, and blue components.

14. An image processing method according to claim 13, wherein said embedding step comprises embedding the digital watermark information in the blue component.

15. An image processing method according to claim 12, wherein said converting step comprises converting the format of the gray-scale image data into color image data in which each pixel includes brightness and chrominance components.

16. An image processing method according to claim 15, wherein said embedding step comprises embedding the digital watermark information in the chrominance component.

17. An image processing method according to claim 12, wherein said embedding step comprises embedding the digital watermark information in such a manner that the overall gray level of the image does not change.

18. A storage medium having recorded thereon a computer-readable image processing program for embedding digital watermark information in a gray-scale image or a color image, said program comprising:

an inputting step of inputting image data;

a judging step of judging whether the inputted image data is gray-scale image data in which each pixel is formed of one component or color image data in which each pixel is formed of a plurality of components;

a converting step of converting the format of the gray-scale image data into color image data in which each pixel is formed of a plurality of components; and an embedding step of embedding the digital watermark information in part of the components of the color image data obtained in said inputting step or in said converting step.

19. A storage medium according to claim 18, wherein said converting step comprises converting the format of the gray-scale image data into color image data in which each pixel includes red, green, and blue components.

20. A storage medium according to claim 19, wherein said embedding step comprises embedding the digital watermark information in the blue component.

21. A storage medium according to claim 18, wherein said converting step comprises converting the format of the gray-scale image data into color image data in which each pixel includes brightness and chrominance components.

22. A storage medium according to claim 21, wherein said embedding step comprises embedding the digital watermark information in the chrominance component.

23. A storage medium according to claim 18, wherein said embedding step comprises embedding the digital watermark information in such a manner that the overall gray level of the image does not change.

24. An image processing device for embedding digital watermark information in a gray-scale image or a color image, comprising:

an input device that inputs image data into said image processing device;

a judging device that judges whether the inputted image data is gray-scale image data in which each pixel is formed of one component or color image data in which each pixel is formed of a plurality of components;

a color converter that converts the gray-scale image data into color image data in which each pixel is formed of a plurality of components;

a color component extracting unit that separates a part of the plurality of components from the remaining components of the color image data obtained by said input device or said color converter; and an embedding unit that adds the digital watermark information to the part of the plurality of components separated by said color component extracting unit.

25. An image processing device according to claim 24, further comprising:

a color component synthesizer for recombining the part of the plurality of components to which the digital watermark information is added with the remaining components of the color image data.

26. An image processing device according to claim 24, wherein said color converter converts the gray-scale image data to a format where each pixel includes red, green, and blue components.

27. An image processing device according to claim 26, wherein said color component extracting unit extracts the blue component and said embedding unit adds the digital watermark information to the blue component.

28. An image processing device according to claim 24, wherein said color converter converts the gray-scale image data to a format where each pixel includes brightness and chrominance components.

29. An image processing device according to claim 28, wherein said color component extracting unit extracts at least a part of the chrominance component and said embedding unit adds the digital watermark information to the extracted part of the chrominance component.

30. An image processing device according to claim 28, further comprising an encoder that compresses and encodes the color image data including the brightness and chrominance components.

\* \* \* \* \*

UNITED STATES PATENT AND TRADEMARK OFFICE
CERTIFICATE OF CORRECTION

PATENT NO. : 6,873,711 B1
DATED : March 29, 2005
INVENTOR(S) : Tomochika Murakami et al.

It is certified that error appears in the above-identified patent and that said Letters Patent is hereby corrected as shown below:

Column 1,
Line 26, "an" should read -- a --.

Column 23,
Line 3, "remains" should read -- remain -- and "is" should read -- are --.

Column 28,
Line 7, "$32C^2$" should read -- $32c^2$ --.

Signed and Sealed this

Twenty-ninth Day of November, 2005

JON W. DUDAS
*Director of the United States Patent and Trademark Office*